US011919039B2

(12) United States Patent
Sun

(10) Patent No.: US 11,919,039 B2
(45) Date of Patent: Mar. 5, 2024

(54) ACOUSTIC TRANSDUCTION UNIT, MANUFACTURING METHOD THEREOF AND ACOUSTIC TRANSDUCER

(71) Applicants: Beijing BOE Technology Development Co., Ltd., Beijing (CN); BOE TECHNOLOGY GROUP CO., LTD., Beijing (CN)

(72) Inventor: Tuo Sun, Beijing (CN)

(73) Assignees: Beijing BOE Technology Development Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 474 days.

(21) Appl. No.: 17/332,884

(22) Filed: May 27, 2021

(65) Prior Publication Data

US 2022/0126320 A1 Apr. 28, 2022

(30) Foreign Application Priority Data

Oct. 28, 2020 (CN) ......................... 202011174025.5

(51) Int. Cl.
*B06B 1/00* (2006.01)
*B06B 1/02* (2006.01)

(52) U.S. Cl.
CPC .................................. *B06B 1/0292* (2013.01)

(58) Field of Classification Search
CPC .................................................... A61B 8/4494
See application file for complete search history.

(56) References Cited

U.S. PATENT DOCUMENTS

| | | | |
|---|---|---|---|
| 10,016,121 | B2 | 7/2018 | Matsumoto et al. |
| 2002/0007118 | A1 | 1/2002 | Adachi et al. |
| 2006/0004289 | A1 | 1/2006 | Tian et al. |
| 2014/0236018 | A1 | 8/2014 | Matsumoto et al. |
| 2019/0118222 | A1 | 4/2019 | Hasegawa et al. |

FOREIGN PATENT DOCUMENTS

| | | | |
|---|---|---|---|
| CN | 1714754 | A | 1/2006 |
| CN | 108704827 | A | 10/2018 |
| CN | 108886660 | A | 11/2018 |
| JP | 2001258879 | A | 9/2001 |

OTHER PUBLICATIONS

China Patent Office, First Office Action dated May 28, 2021, for corresponding Chinese application No. 202011174025.5.

*Primary Examiner* — Joseph M Santos Rodriguez
(74) *Attorney, Agent, or Firm* — HOUTTEMAN LAW LLC

(57) ABSTRACT

An acoustic transduction unit is provided including: a first electrode on a base substrate, a support pattern on a side of the first electrode distal to the base substrate, a vibrating diaphragm pattern surrounded by the support pattern, the first electrode and the vibrating diaphragm pattern and on a side of the support pattern distal to the first electrode; and a second electrode on a side of the vibrating diaphragm pattern distal to the first electrode and opposite to the first electrode; and a first dielectric pattern at the bottom of the vibrating cavity; wherein a thickness of the first dielectric pattern gradually increases from a first vertex to an edge of the first dielectric pattern; and/or, a second dielectric pattern at the top of the vibrating cavity; wherein a thickness of the second dielectric pattern gradually increases from a second vertex to an edge of the second dielectric pattern.

20 Claims, 14 Drawing Sheets

ACOUSTIC TRANSDUCTION UNIT, MANUFACTURING METHOD THEREOF AND ACOUSTIC TRANSDUCER

CROSS REFERENCE TO RELATED APPLICATIONS

The present application claims the priority of the Chinese Patent Application No. 202011174025.5 filed on Oct. 28, 2020, the content of which is incorporated herein by reference in its entirety.

TECHNICAL FIELD

The present disclosure relates to an acoustic transduction unit, a method manufacturing thereof, and an acoustic transducer.

BACKGROUND

Ultrasonic detection may be applied in various fields, such as medical imaging, therapy, industrial flowmeters, automotive radars, indoor positioning, and so on. Especially in the medical imaging field, the ultrasonic detection, together with X-ray imaging and NMR (nuclear magnetic resonance) imaging, are called three major medical imaging techniques. An acoustic transducer is a device which may be used for the ultrasonic detection, and an acoustic transduction unit is a core component in the acoustic transducer.

Capacitive Micro-machined Ultrasonic Transducer (CMUT) has the characteristics of good consistency, wide frequency band and the like, and thus, is widely accepted.

SUMMARY

The present disclosure aims to solve at least one of the technical problems in the prior art, and provides an acoustic transduction unit, a manufacturing method thereof and an acoustic transducer.

In a first aspect, the embodiment of the present disclosure provides an acoustic transduction unit including: a base substrate, a first electrode, a support pattern, a vibrating diaphragm pattern and a second electrode, wherein the first electrode is on the base substrate; the support pattern is on a side of the first electrode distal to the base substrate; a vibrating cavity is surrounded by the support pattern, the first electrode and the vibrating diaphragm pattern; the vibrating diaphragm pattern is on a side of the support pattern distal to the first electrode, and is configured to vibrate in the vibrating cavity, and the second electrode is on a side of the vibrating diaphragm pattern distal to the first electrode, and is opposite to the first electrode; wherein the acoustic transduction unit further includes: a first dielectric pattern at a bottom of the vibrating cavity and including a first apex at the bottom of the vibrating cavity; wherein a thickness of the first dielectric pattern gradually increases from the first vertex to an edge of the first dielectric pattern; and/or, a second dielectric pattern at a top of the vibrating cavity and including a second apex at the top of the vibrating cavity; wherein a thickness of the second dielectric pattern gradually increases from the second vertex to an edge of the second dielectric pattern.

In some embodiments, the first vertex of the first dielectric pattern coincides with a center of the vibrating cavity; and/or, the second vertex of the second dielectric pattern coincides with a center of the vibrating cavity.

In some embodiments, the acoustic transduction unit includes the first dielectric pattern; a surface of the first dielectric pattern proximal to the first electrode is a plane parallel to a plane where the base substrate is located; a surface of the first dielectric pattern distal to the first electrode is a slope surface and intersects with the surface of the first dielectric pattern proximal to the first electrode, and a slope angle between the slope surface and the plane is in a range of (0°, 15°].

In some embodiments, the acoustic transduction unit includes the second dielectric pattern, a surface of the second dielectric pattern proximal to the vibrating diaphragm pattern is a plane parallel to a plane where the base substrate is located; a surface of the second dielectric pattern distal to the vibrating diaphragm pattern is a slope surface and intersects with the surface of the second dielectric pattern proximal to the vibrating diaphragm pattern, and a slope angle between the slope surface and the plane is in a range of (0°, 15°].

In some embodiments, the acoustic transduction unit further includes: an etching barrier layer between the first electrode and the support pattern, wherein the acoustic transduction unit includes the first dielectric pattern, and a material of the first dielectric pattern is the same as that of the etching barrier layer; the first dielectric pattern extends from the first apex of the first dielectric pattern in a direction from the center toward the edge of the vibrating cavity, such that the thickness of the first dielectric pattern gradually increases from the first apex to the edge of the first dielectric pattern.

In some embodiments, the acoustic transduction unit includes the second dielectric pattern, and a material of the second dielectric pattern is the same as that of the vibrating diaphragm pattern.

In some embodiments, the second dielectric pattern and the vibrating diaphragm pattern are connected to each other and have a one-piece structure, i.e. the second dielectric pattern and the vibrating diaphragm pattern are formed as a single piece.

In some embodiments, the acoustic transduction unit includes the first dielectric pattern; a surface of the first dielectric pattern proximal to the first electrode is a plane parallel to a plane where the base substrate is located; a surface of the first dielectric pattern distal to the first electrode is a slope surface and intersects with the surface of the first dielectric pattern proximal to the first electrode, and a slope angle between the slope surface and the plane is in a range of (0°, 15°], and the acoustic transduction unit includes the second dielectric pattern, a surface of the second dielectric pattern proximal to the vibrating diaphragm pattern is a plane parallel to a plane where the base substrate is located; a surface of the second dielectric pattern distal to the vibrating diaphragm pattern is a slope surface and intersects with the surface of the second dielectric pattern proximal to the vibrating diaphragm pattern, and a slope angle between the slope surface and the plane is in a range of (0°, 15°].

In some embodiments, a material of the first dielectric pattern is the same as that of an etching barrier layer, which is between the first electrode and the support pattern; wherein the first dielectric pattern extends from the first apex of the first dielectric pattern in a direction from the center toward the edge of the vibrating cavity, such that the thickness of the first dielectric pattern gradually increases from the first apex to the edge of the first dielectric pattern; and wherein the acoustic transduction unit includes the second dielectric pattern, and a material of the second dielectric pattern is the same as that of the vibrating diaphragm pattern; and the second dielectric pattern and the vibrating diaphragm pattern are connected to each other and have a one-piece structure.

In a second aspect, the embodiment of the present disclosure provides an acoustic transducer including: at least one acoustic transduction unit according to any one of the embodiments of the first aspect of the present disclosure.

In some embodiments, the first vertex of the first dielectric pattern coincides with a center of the vibrating cavity; and/or, the second vertex of the second dielectric pattern coincides with a center of the vibrating cavity.

In some embodiments, the acoustic transduction unit includes the first dielectric pattern; a surface of the first dielectric pattern proximal to the first electrode is a plane parallel to a plane where the base substrate is located; a surface of the first dielectric pattern distal to the first electrode is a slope surface and intersects with the surface of the first dielectric pattern proximal to the first electrode, and a slope angle between the slope surface and the plane is in a range of (0°, 15°].

In some embodiments, the acoustic transduction unit includes the second dielectric pattern, a surface of the second dielectric pattern proximal to the vibrating diaphragm pattern is a plane parallel to a plane where the base substrate is located; a surface of the second dielectric pattern distal to the vibrating diaphragm pattern is a slope surface and intersects with the surface of the second dielectric pattern proximal to the vibrating diaphragm pattern, and a slope angle between the slope surface and the plane is in a range of (0°, 15°].

In a third aspect, the embodiment of the present disclosure provides a method for manufacturing the acoustic transduction unit according to any one of the embodiments of the first aspect of the present disclosure, including steps of: forming a first electrode on a base substrate; forming a support pattern and a vibrating diaphragm pattern on a side of the first electrode distal to the base substrate, wherein the support pattern is located on a side of the first electrode distal to the base substrate, and the vibrating diaphragm pattern is located on a side of the support pattern distal to the first electrode, such that a vibrating cavity is surrounded by the support pattern, the first electrode and the vibrating diaphragm pattern, and the vibrating diaphragm pattern is configured to vibrate in the vibrating cavity; and forming a second electrode on a side of the vibrating diaphragm pattern distal to the first electrode, wherein the second electrode is provided opposite to the first electrode; wherein after the step of forming the first electrode and before the step of forming the support pattern and the vibrating diaphragm pattern, the method for manufacturing the acoustic transduction unit further includes: forming a first dielectric pattern on a side of the first electrode distal to the base substrate, wherein the first dielectric pattern is located at the bottom of the vibrating cavity and includes a first vertex located at the bottom of the vibrating cavity; a thickness of the first dielectric pattern gradually increases from the first vertex to an edge of the first dielectric pattern; and/or, while forming the support pattern and the vibrating diaphragm pattern, the method for manufacturing the acoustic transduction unit further includes: forming a second dielectric pattern located at the top of the vibrating cavity and including a second apex located at the top of the vibrating cavity; wherein a thickness of the second dielectric pattern gradually increases from the second vertex to an edge of the second dielectric pattern.

In some embodiments, the first vertex of the first dielectric pattern coincides with a center of the vibrating cavity; and/or, the second vertex of the second dielectric pattern coincides with a center of the vibrating cavity.

In some embodiments, the step of forming a first dielectric pattern on a side of the first electrode distal to the base substrate includes steps of: forming a first dielectric material film on the side of the first electrode distal to the base substrate; coating a first photoresist film on a side of the first dielectric material film distal to the first electrode, exposing the first photoresist film by using a gray tone mask, and developing the exposed first photoresist film, so as to obtain a first photoresist pattern, wherein a surface of the first photoresist pattern proximal to the first dielectric material film is a plane parallel to a plane where the base substrate is located, and a surface of the first photoresist pattern distal to the first dielectric material film is a slope surface and intersects with the surface of the first photoresist pattern proximal to the first dielectric material film; performing a dry etching process on the first photoresist pattern and the first dielectric material film to obtain a first dielectric pattern, wherein the surface of the first dielectric pattern distal to the first electrode is a slope surface and intersects with the surface of the first dielectric pattern proximal to the first electrode.

In some embodiments, the step of forming a support pattern and a vibrating diaphragm pattern on a side of the first electrode distal to the base substrate includes steps of: forming a sacrificial pattern on a side of the first dielectric pattern distal to the base substrate; forming a support and vibrating diaphragm material film on a side of the first electrode distal to the base substrate, wherein the support and vibrating diaphragm material film covers the side surface of the sacrificial pattern and the surface of the sacrificial pattern distal to the base substrate; performing a patterning process on the support and vibrating diaphragm material film to obtain the support pattern and the vibrating diaphragm pattern, wherein the support pattern is located on the side of the sacrificial pattern; the vibrating diaphragm pattern is located on the surface of the sacrificial layer pattern distal to the base substrate, and is located on the surface of the support pattern distal to the base substrate; the vibrating diaphragm pattern is formed with release holes; removing the sacrificial pattern through the release holes, to obtain the vibrating cavity; forming filling patterns for filling the release holes.

In some embodiments, the step of forming the support pattern, the vibrating diaphragm pattern, and the second dielectric pattern includes steps of: forming a sacrificial pattern on a side of the first electrode distal to the base substrate; wherein an accommodating groove for accommodating a second dielectric pattern to be formed subsequently is formed on a side of the sacrificial pattern distal to the base substrate; forming a support pattern on a side surface of the sacrificial pattern, forming a second dielectric pattern and a vibrating diaphragm pattern on a side of the sacrificial pattern distal to the first electrode, and forming the vibrating diaphragm pattern on a side of the support pattern distal to the first electrode, wherein the vibrating diaphragm pattern is located on a side of the second dielectric pattern distal to the first electrode, and release holes are formed on the vibrating diaphragm pattern; removing the sacrificial pattern through the release holes, to obtain the vibrating cavity; forming filling patterns for filling the release holes.

In some embodiments, the sacrificial pattern includes: a first sacrificial sub-pattern and a second sacrificial sub-pattern provided in a stack, wherein the step of forming the sacrificial pattern includes steps of: forming a first sacrificial sub-pattern on a side of the first electrode distal to the base substrate; forming a second sacrificial material film on a side of the first sacrificial sub-pattern distal to the base substrate; coating a second photoresist film on a side of the second sacrificial material film distal to the first electrode, exposing the second photoresist film by using a gray tone mask, and developing the exposed second photoresist film, so as to obtain a second photoresist pattern, wherein a surface of the second photoresist pattern distal to the base substrate is a slope surface, and a thickness of the second photoresist pattern is gradually reduced in a direction from the center toward the edge of the vibrating cavity; performing a dry etching process on the second photoresist pattern and the second sacrificial material film to obtain a second sacrificial sub-pattern, wherein a surface of the second sacrificial sub-pattern distal to the first electrode is a slope surface and intersects with a surface of the second sacrificial sub-pattern proximal to the first electrode so as to form the accommodating groove.

In some embodiments, the step of forming the support pattern on a side surface of the sacrificial pattern and forming the second dielectric pattern and the vibrating diaphragm pattern on a side of the sacrificial pattern distal to the first electrode and forming the vibrating diaphragm pattern on a side of the support pattern distal to the first electrode includes steps of: forming a support and vibrating diaphragm material film on a side of the first electrode distal to the base substrate, performing a patterning process on the support and vibrating diaphragm material film to obtain the support pattern, the second dielectric pattern and the vibrating diaphragm pattern.

DETAIL DESCRIPTION OF EMBODIMENTS

To enable one of ordinary skill in the art to better understand technical solutions of the present disclosure, an acoustic transduction unit, a manufacturing method thereof and an acoustic transducer according to the present disclosure will be further described in detail below with reference to the accompanying drawings.

At present, a larger pull-in operating voltage needs to be preset in a CMUT device on the market to realize the effect of tensioning of a vibrating diaphragm so as to improve the sensitivity and realize a large acoustic intensity for emission. However, it is usually difficult to obtain the larger pull-in operating voltage, and a high-specification power supply chip is required to obtain the larger pull-in operating voltage. In addition, the CMUT operates at a large voltage for a long time, which adversely affects reliability and lifetime of the device. Meanwhile, as the CMUT is likely to contact a human body, a larger voltage will bring a greater risk.

In the following embodiments, an ultrasonic wave is exemplified as an example, wherein the ultrasonic wave refers to an acoustic wave having a frequency of 20 kHz to 1 GHz. Alternatively, the technical solution of the present disclosure is also applicable to acoustic waves having other frequencies.

Figure 1:
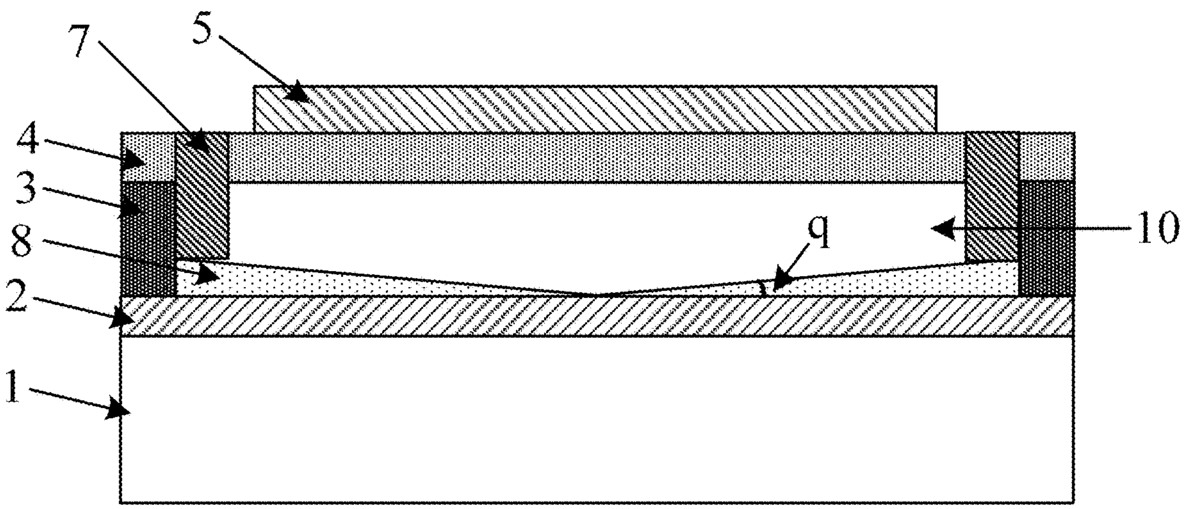
FIG. 1 is a schematic cross-sectional diagram of an acoustic transduction unit according to an embodiment of the present disclosure.

FIG. 1 is a schematic cross-sectional diagram of an acoustic transduction unit according to an embodiment of the present disclosure. As shown in FIG. 1, the acoustic transduction unit includes: a base substrate 1, a first electrode 2, a support pattern 3, a vibrating diaphragm pattern 4, a second electrode 5 and a first dielectric pattern 8, wherein the first electrode 2 is located on the base substrate 1; the support pattern 3 is located on a side of the first electrode 2 distal to the base substrate 1 and is encircled to form a vibrating cavity 10 therein; the vibrating diaphragm pattern 4 is located on a side of the support pattern 3 distal to the first electrode 2 and may vibrate in the vibrating cavity 10; the second electrode 5 is located on a side of the vibrating diaphragm pattern 4 distal to the first electrode 2 and is opposite to the first electrode 2; the first dielectric pattern 8 is located at the bottom of the vibrating cavity 10 (i.e., the first dielectric pattern 8 is located on a side of the first electrode 2 distal to the base substrate 1), and includes a first vertex located at the bottom of the vibrating cavity 10; a thickness of the first dielectric pattern 8 gradually increases from the first apex to an edge of the first dielectric pattern 8.

In the embodiment of the present disclosure, a "center" of a structure specifically refers to a portion within the structure, an orthographic projection of the portion on the base substrate 1 overlaps with a center point of a pattern of an orthographic projection of the entire structure on the base substrate 1. An "edge" of a structure specifically refers to a portion of the structure, an orthographic projection of the portion on the base substrate overlaps with an edge of a pattern of the orthographic projection of the structure on the base substrate 1. A thickness direction is perpendicular to a plane where the base substrate is located.

In the embodiment of the present disclosure, the first vertex of the first dielectric pattern 8 is located on the side of the first electrode 2 distal to the base substrate 1, and has a certain deviation from the center of the vibrating cavity 10. However, the present disclosure is not limited thereto. In other embodiments, the first vertex of the first dielectric pattern 8 may coincide with the center of the vibrating cavity 10, as shown in FIG. 1.

In the embodiment of the present disclosure, the first dielectric pattern 8 may have a shape that is centrosymmetric about its first vertex, as shown in FIG. 1. However, the present disclosure is not limited thereto. In other embodiments, the first dielectric pattern 8 may have other shapes.

In the embodiment of the present disclosure, the first dielectric pattern 8 is provided such that on the premise of ensuring that the vibrating diaphragm pattern 4 in the acoustic transduction unit has an effective travel, the pull-in operating voltage of the acoustic transduction unit may be reduced, while a capacitance of the device may be increased, and a sensitivity of the device may be increased.

When ultrasonic detection is performed, the acoustic transduction unit in the embodiment of the present disclosure is in a transmitting state firstly, and then is switched to a receiving state.

When the acoustic transduction unit is in the transmitting state, a forward direct current bias voltage VDC (i.e., the pull-in operating voltage) is loaded across the second electrode 5 and the first electrode 2, such that a capacitor is formed between the first electrode 2 and the second electrode 5, and the vibrating diaphragm pattern 4 is bent and deformed downward (a direction proximal to the first electrode 2) under the electrostatic action. On this basis, an alternating voltage VAC of a frequency f (a magnitude of f is set according to actual requirement) is applied across the second electrode 5 and the first electrode 2, so that the vibrating diaphragm pattern 4 is excited to reciprocate greatly (reciprocate in the direction proximal to the first electrode 2 and in a direction distal to the first electrode 2), realizing the conversion of electric energy into mechanical energy. The vibrating diaphragm pattern 4 radiates energy to the medium environment, generating ultrasonic waves. Some ultrasonic waves may be reflected on a surface of an object to be detected and return to the acoustic transduction unit, and be received and detected by the acoustic transduction unit.

In the embodiment of the present disclosure, on the premise that the vibrating diaphragm pattern 4 may reach the effective travel all the time, an intensity (represented by a sound pressure level) of the ultrasonic wave transmitted by the acoustic transduction unit is positively correlated to a magnitude of the pull-in operating voltage and a magnitude of an inter-plate capacitance formed by the first electrode 2 and the second electrode 5.

When the acoustic transduction unit is in the receiving state, only the direct current bias voltage (i.e., the pull-in operating voltage) is loaded across the second electrode 5 and the first electrode 2, such that the vibrating diaphragm pattern 4 reaches a static balance under the action of an electrostatic force and a membrane restoring force. When acoustic waves act on the vibrating diaphragm pattern 4, the vibrating diaphragm pattern 4 is excited to vibrate, such that a cavity pitch between the second electrode 5 and the first electrode 2 changes, causing a change in the inter-plate capacitance, thereby generating a detectable electrical signal. Detection of the received ultrasonic waves may be achieved based on the electrical signal.

In the embodiment of the present disclosure, on the premise that the vibrating diaphragm pattern 4 may reach the effective travel all the time and the received acoustic wave intensity is constant, a signal intensity (represented by a magnitude of a current or a magnitude of a voltage) of the electrical signal generated by the acoustic transduction unit for performing the ultrasonic detection is positively correlated to the magnitude of the pull-in operating voltage and the magnitude of the inter-plate capacitance formed by the first electrode 2 and the second electrode 5.

Figure 2A:
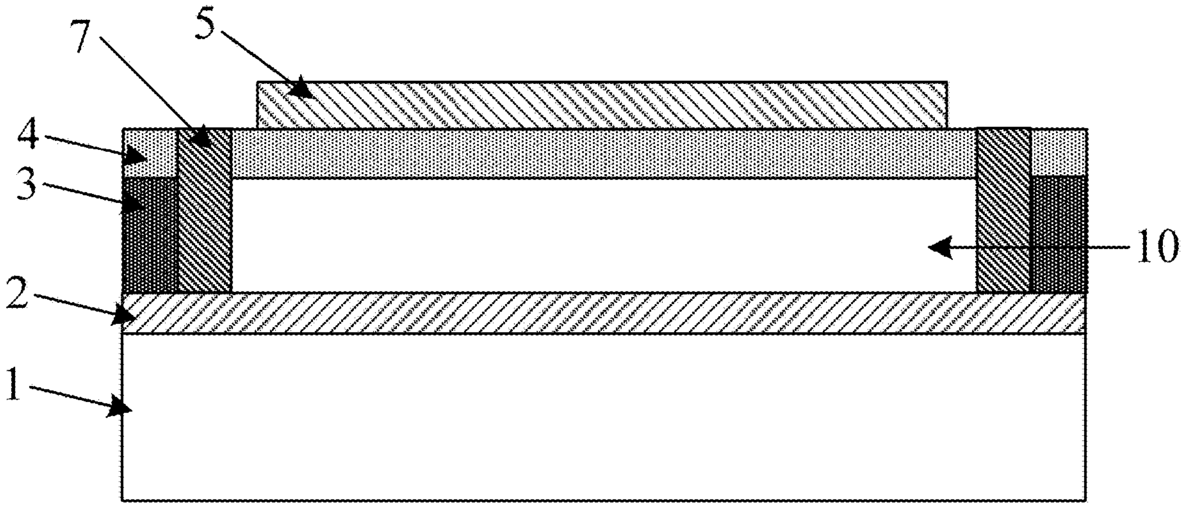
FIG. 2*a* is a schematic cross-sectional diagram of an acoustic transduction unit in the related art.
Figure 2B:
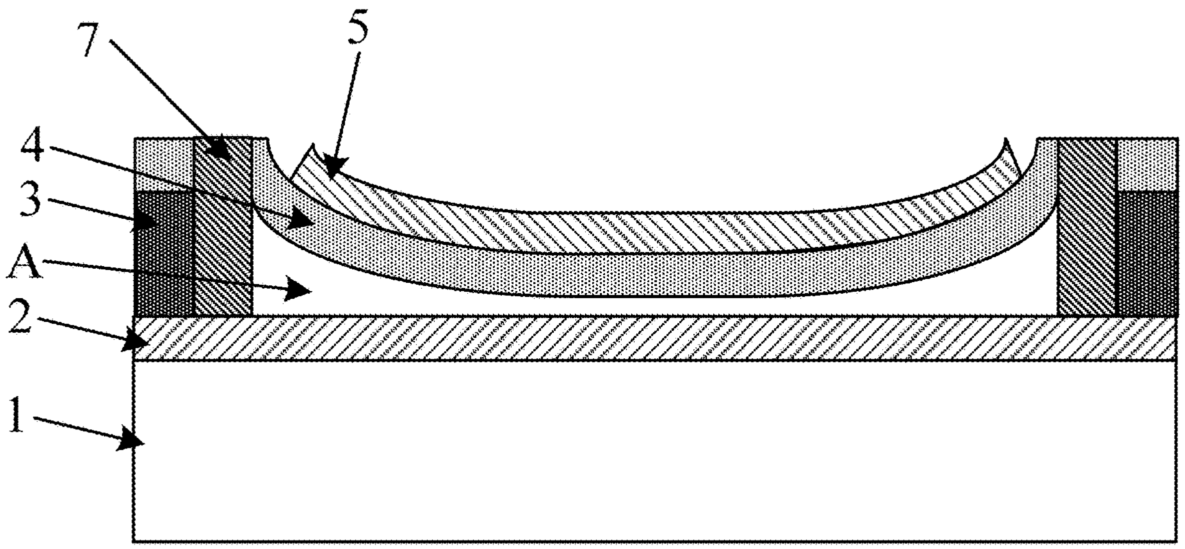
FIG. 2*b* is a schematic diagram of a vibrating diaphragm pattern in a maximum amplitude state in the vibrating acoustic transduction unit shown in FIG. 2*a;*

FIG. 2*a* is a schematic cross-sectional diagram of an acoustic transduction unit in the related art. FIG. 2*b* is a schematic diagram of a vibrating diaphragm pattern 4 in a maximum amplitude state in the vibrating acoustic transduction unit shown in FIG. 2*a*. As shown in FIGS. 2*a* and 2*b*, the acoustic transduction unit includes only: the base substrate 1, the support pattern 3, the diaphragm pattern 4, the first electrode 2, and the second electrode 5, excluding the first dielectric pattern 8 in the embodiment of the present disclosure; only the vibrating diaphragm pattern 4 and the vibrating cavity 10 are provided between the first electrode 2 and the second electrode 5.

In the embodiment of the present disclosure, however, not only the vibrating diaphragm pattern 4 and the vibrating cavity 10, but also the first dielectric pattern 8 are provided between the first electrode 2 and the second electrode 5. The vibrating cavity may be vacuum or have a certain amount of gas therein.

Due to the presence of the first dielectric pattern 8, a dielectric constant of the dielectric between the two electrodes in the acoustic transduction unit according to the embodiment of the present disclosure is greater than that in the related art. In a case where an effective overlap area and a distance between the two electrodes are uniform, the inter-plate capacitance formed by the two electrodes in the acoustic transduction unit according to the embodiment of the present disclosure is greater than that in the related art.

In the process of transmitting ultrasonic waves, in a case where the pull-in operating voltages are the same, the intensity of the ultrasonic waves transmitted by the acoustic transduction unit according to the embodiment of the present disclosure is greater than that in the related art. That is, in a case where the intensity of the ultrasonic wave required to be transmitted is constant, the pull-in operating voltage required by the acoustic transduction unit according to the embodiment of the present disclosure is smaller.

Figure 3:
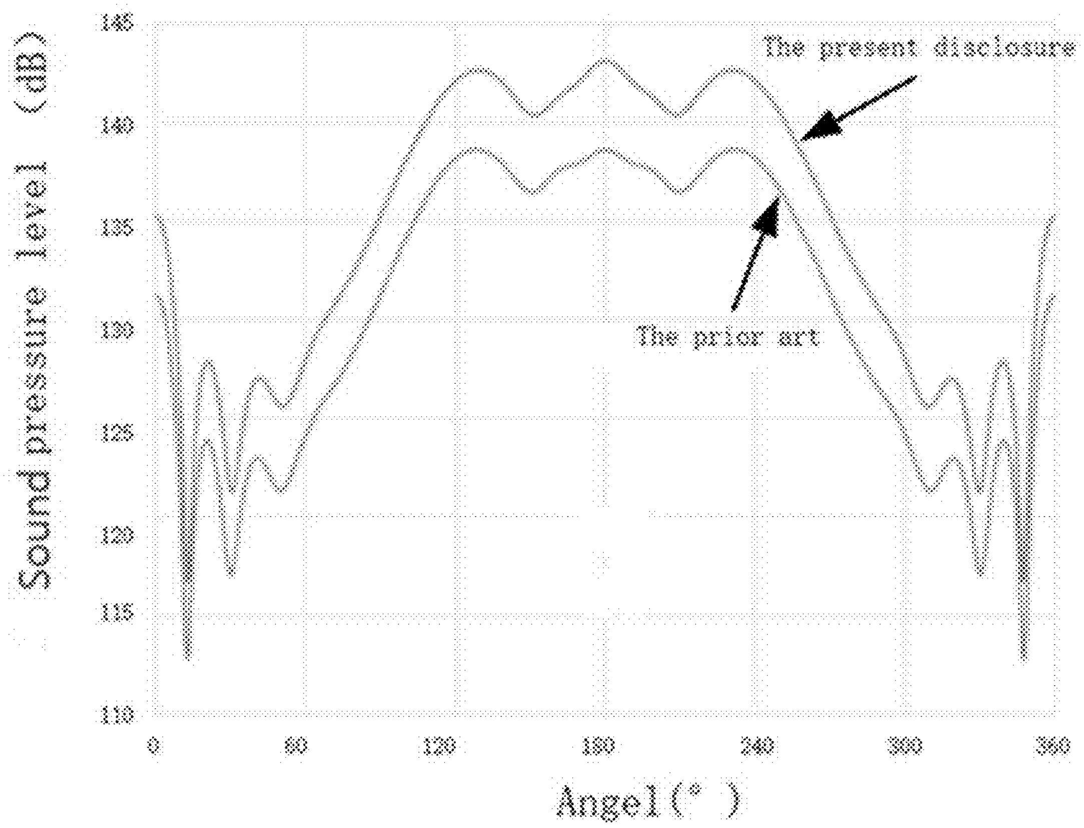
FIG. 3 is a schematic diagram of a relation of sound pressure levels with respect to angles for the ultrasonic waves transmitted from an acoustic transduction unit according to an embodiment of the present disclosure and an acoustic transduction unit in the related art.

FIG. 3 is a schematic diagram of a relation of sound pressure levels with respect to angles for the ultrasonic waves transmitted from an acoustic transduction unit according to an embodiment of the present disclosure and an acoustic transduction unit in the related art. As shown in FIG. 3, FIG. 3 is used to describe the intensity (represented by a sound pressure level) of the ultrasonic waves transmitted by the acoustic transduction unit in different directions (represented by angles). FIG. 3 is a schematic diagram illustrating the relationship between the intensity and the angle of the ultrasonic wave transmitted by the acoustic transduction unit according to the present disclosure and the related art when loaded with a same pull-in operating voltage. As may be seen from FIG. 3, under the same pull-in operating voltage and in the same direction (i.e., a same angle), the intensity of the ultrasonic wave transmitted by the acoustic transduction unit according to the embodiment of the present disclosure is always greater than that in the related art.

In the process of receiving the ultrasonic waves, in a case where the pull-in operating voltage is the same and the intensity of the received ultrasonic waves is the same, the intensity of the electric signals generated by the acoustic transduction unit according to the embodiment of the present disclosure is greater than that in the related art. That is, the acoustic transduction unit according to the embodiment of the present disclosure has a better detection sensitivity.

Referring to FIG. 2*b*, in the prior art, a vibrating amplitude of the vibrating diaphragm pattern 4 gradually decreases in a direction from the central region to the edge region during the vibrating diaphragm pattern 4 vibrates, such that the vibrating pattern cannot reach a region A in the vibrating cavity 10.

Based on the above analysis, in the embodiment of the present disclosure, the first dielectric pattern 8 may be disposed in the region A shown in FIG. 2*b*, without affecting the effective travel of the vibrating diaphragm pattern 4.

In some embodiments, a surface of the first dielectric pattern 8 proximal to the first electrode 2 is a plane parallel to a plane where the base substrate 1 is located. A surface of the first dielectric pattern 8 distal to the first electrode 2 is a slope surface and intersects with the surface of the first dielectric pattern 8 proximal to the first electrode 2, and an included angle (i.e., a slope angle q) between the slope surface and the plane of the first dielectric pattern 8 is in a range of (0°, 15°].

It should be noted that, in the embodiment of the present disclosure, the slope surface of the first dielectric pattern 8 distal to the first electrode 2, as shown in FIG. 1, has a cross-sectional shape of a line segment on a plane perpendicular to the plane where the base substrate 1 is located. In other embodiments of the present disclosure, the cross-sectional shape of the slope surface on the plane perpendicular to the plane where the base substrate 1 is located may also have other shapes, such as a curve.

In the embodiment of the present disclosure, by disposing the first dielectric pattern 8 at the bottom of the vibrating cavity 10, the thickness of the first dielectric pattern 8 is gradually increased in a direction from the center to the edge of the first dielectric pattern 8. In this way, on the premise of ensuring that the vibrating diaphragm pattern 4 in the acoustic transduction unit may reach the effective travel, the pull-in operating voltage of the acoustic transduction unit may be reduced, while the capacitance of the device is improved, and the sensitivity of the device is increased. In practical applications, the shape of the first dielectric pattern 8 may be designed according to practical requirements. The technical solution of the present disclosure does not define a specific shape of the first dielectric pattern 8.

Figure 4A:
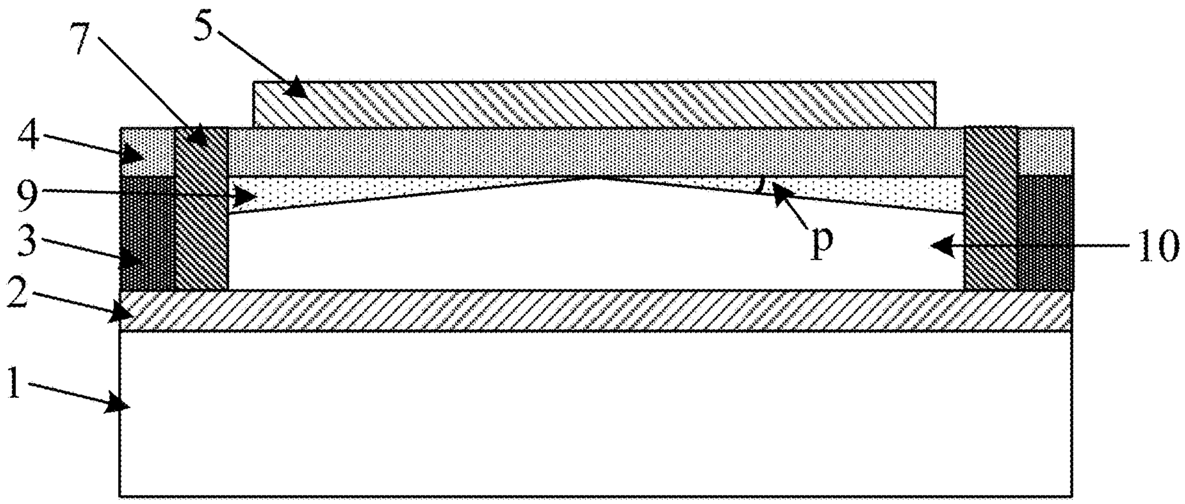
FIG. 4*a* is a schematic structural diagram of another acoustic transduction unit according to the embodiment of the present disclosure.

FIG. 4*a* is a schematic structural diagram of another acoustic transduction unit according to the embodiment of the present disclosure. As shown in FIG. 4*a*, unlike those shown in FIG. 1, the acoustic transduction unit shown in FIG. 4*a* does not include the first dielectric pattern 8 but includes a second dielectric pattern 9. The second dielectric pattern 9 is located on top of the vibrating cavity 10 (i.e. the second dielectric pattern 9 is located on a side of the vibrating diaphragm pattern 4 proximal to the base substrate 1), and includes a second vertex located on top of the vibrating cavity 10; a thickness of the second dielectric pattern 9 gradually increases from the second apex to the edge of the second dielectric pattern 9.

In the embodiment of the present disclosure, the second vertex of the second dielectric pattern 9 is located on a side of the vibrating diaphragm pattern 4 distal to the second electrode 5, and has a certain deviation from the center of the vibrating cavity 10. However, the present disclosure is not limited thereto. In other embodiments, the second vertex of the second dielectric pattern 9 may coincide with the center of the vibrating cavity 10, as shown in FIG. 4*a*.

In the embodiment of the present disclosure, the second dielectric pattern 9 may have a shape that is centrosymmetric about its second vertex, as shown in FIG. 4*a*. However, the present disclosure is not limited thereto. In other embodiments, the second dielectric pattern 9 may have other shapes.

Based on the foregoing discussion of the principle in which the first dielectric pattern 8 is provided to increase the inter-plate capacitance between the first electrode 2 and the second electrode 5, in the embodiment of the present disclosure, similarly, the second dielectric pattern 9 is provided on the top of the vibrating cavity 10 to increase the inter-plate capacitance between the first electrode 2 and the second electrode 5, so that the pull-in operating voltage of the acoustic transduction unit may be reduced, and the sensitivity of the device may be increased.

In the embodiment of the present disclosure, when the second dielectric pattern 9 is designed, it is required to ensure that when the vibrating diaphragm pattern 4 is at the maximum vibrating amplitude, the second dielectric pattern 9 located below the vibrating diaphragm pattern does not squeeze the bottom and the side of the vibrating cavity 10. That is, when the vibrating diaphragm pattern 4 is at the maximum vibrating amplitude, the second dielectric pattern 9 is located in the region A shown in FIG. 2*b*, so as to ensure that the vibrating diaphragm pattern 4 in the acoustic transduction unit may reach the effective travel.

In the embodiment of the present disclosure, a circular vibrating cavity is taken as an example. However, the present disclosure is not limited thereto. The vibrating cavity may have other shapes, even irregular shapes. Similarly, the first dielectric pattern 8 and the second dielectric pattern 9 may also have an asymmetrical shape, even an irregular shape, as long as the first dielectric pattern 8 and the second dielectric pattern 9 may fill in the region A shown in FIG. 2*b*, while ensuring that the vibrating diaphragm pattern 4 at the maximum vibrating amplitude does not squeeze the bottom and the side of the vibrating cavity 10.

In some embodiments, a material of the second dielectric pattern 9 is the same as a material of the vibrating diaphragm pattern 4.

In some embodiments, the second dielectric pattern 9 and the vibrating diaphragm pattern 4 are connected to each other and are integrally formed. That is, the second dielectric pattern 9 and the vibrating diaphragm pattern 4 may be manufactured in a same process.

In some embodiments, the thickness of the first dielectric pattern 8 or the second dielectric pattern 9 (i.e., a maximum distance between the slope surface and the plane of the first dielectric pattern 8 or the second dielectric pattern 9) is in a range of 0.1 um to 5 um.

In some embodiments, when the acoustic transduction unit includes the second dielectric pattern 9, a surface of the second dielectric pattern 9 proximal to the vibrating diaphragm pattern 4 is a plane parallel to a plane where the base substrate 1 is located. A surface of the second dielectric pattern 9 distal to the vibrating diaphragm pattern 4 is a slope surface and intersects with the surface of the second dielectric pattern 9 proximal to the vibrating diaphragm pattern 4, and an included angle (i.e., a slope angle p) between the slope surface and the plane of the second dielectric pattern 9 is in a range of (0°, 15°].

In the embodiment of the present disclosure, by disposing the second dielectric pattern 9 on the top of the vibrating cavity 10, the thickness of the second dielectric pattern 9 is gradually increased in a direction from the center to the edge of the second dielectric pattern 9. In this way, on the premise of ensuring that the vibrating diaphragm pattern 4 in the acoustic transduction unit may reach the effective travel, the pull-in operating voltage of the acoustic transduction unit may be reduced, while the capacitance of the device is improved, and the sensitivity of the device is increased. In practical applications, the shape of the second dielectric pattern 9 may be designed according to practical requirements. The technical solution of the present disclosure does not define a specific shape of the second dielectric pattern 9.

Figure 4B:
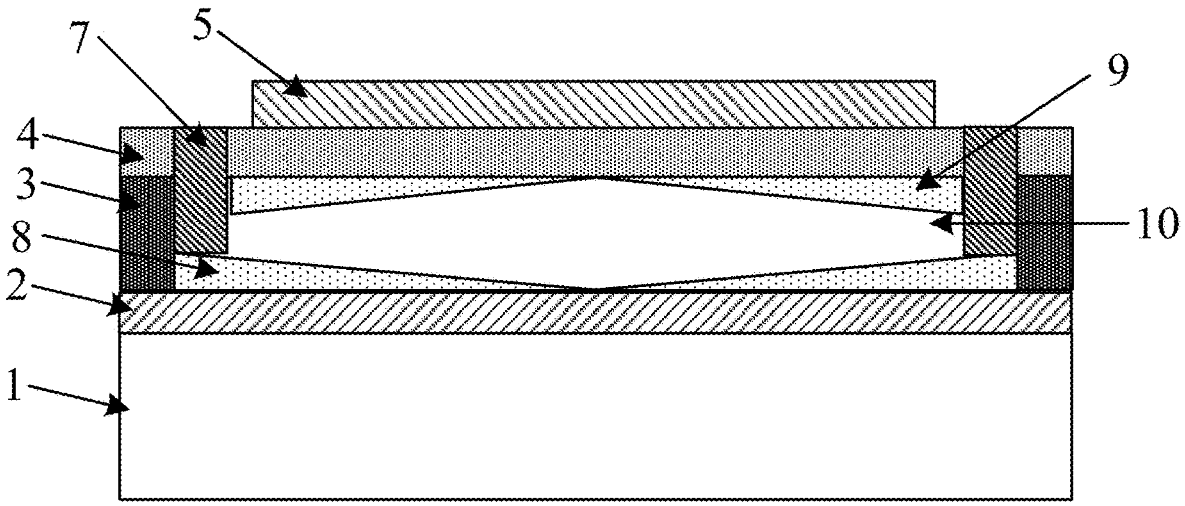
FIG. 4*b* is a schematic structural diagram of another acoustic transduction unit according to an embodiment of the present disclosure.

FIG. 4*b* is a schematic structural diagram of another acoustic transduction unit according to an embodiment of the present disclosure. It is noted that, as shown in FIG. 4*b*, in some embodiments, the first dielectric pattern 8 shown in FIG. 1 and the second dielectric pattern 9 shown in FIG. 4*a* are simultaneously disposed in the acoustic transduction unit. When the vibrating diaphragm pattern 4 is at the maximum vibrating amplitude, the first dielectric pattern 8 and the second dielectric pattern 9 are both located in the region A shown in FIG. 2*b*, the first dielectric pattern 8 and the second dielectric pattern 9 do not squeeze each other. The technical solution of the present disclosure does not define a specific shape of the first dielectric pattern 8 and the second dielectric pattern 9.

Figure 5:
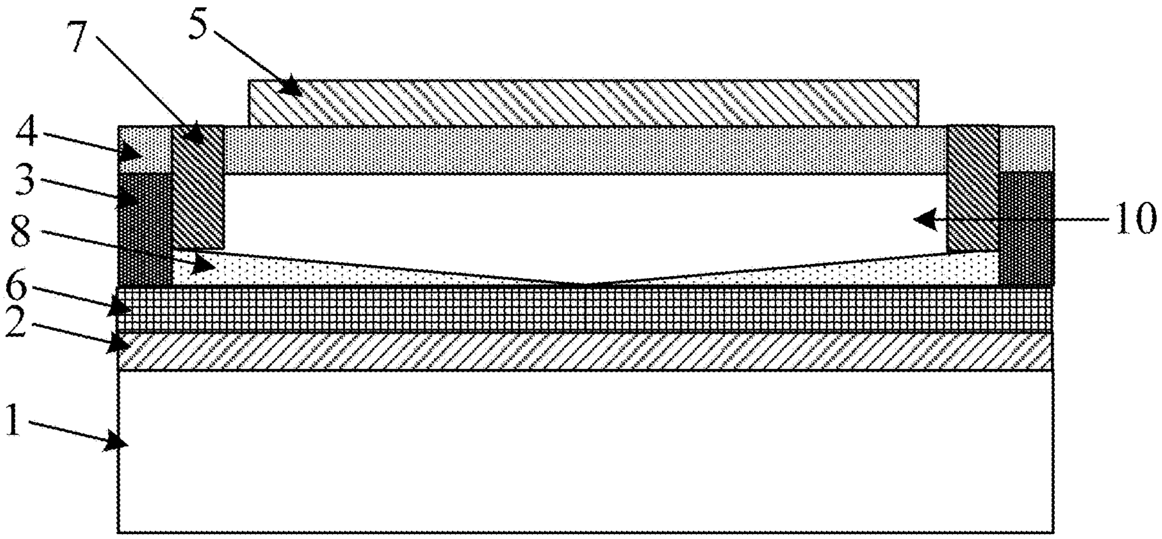
FIG. 5 is a schematic structural diagram of another acoustic transduction unit according to the embodiment of the present disclosure.

FIG. 5 is a schematic structural diagram of another acoustic transduction unit according to the embodiment of the present disclosure. As shown in FIG. 5, unlike those shown in FIG. 1, an etching barrier layer 6 is further provided in the acoustic transduction unit shown in FIG. 5. The etching barrier layer 6 is located between the first electrode 2 and the support pattern 3, and may be used to protect the first electrode 2, so as to avoid damage to the first electrode 2 in the process of forming the first dielectric pattern and forming the support pattern 3/the vibrating diaphragm pattern 4.

In some embodiments, the material of the first dielectric pattern 8 is the same as a material of the etching barrier layer 6. A material selection of the etching barrier layer 6 is related to a material selection of the support pattern 3/the vibrating diaphragm pattern 4 and a material of a sacrificial pattern 12 used in forming the support pattern 3/the vibrating diaphragm pattern 4. Only it is ensured that in the process of forming the support pattern 3/the vibrating diaphragm pattern 4, the etching barrier layer 6 prevents the first electrode 2 located below the etching barrier layer 6 from being etched mistakenly.

In some embodiments, the first dielectric pattern 8 extends from the first apex of the first dielectric pattern 8 in the direction from the center toward the edge of the vibrating cavity 10 such that the thickness of the first dielectric pattern 8 gradually increases from the first apex to the edge of the first dielectric pattern 8. That is, the first dielectric pattern 8 has a ring shape, and is not presented near the center at the bottom of the vibrating cavity 10.

Similarly, in some embodiments, the second dielectric pattern 9 extends from the second apex of the second dielectric pattern 9 in the direction from the center toward the edge of the vibrating cavity 10 such that the thickness of the second dielectric pattern 9 gradually increases from the second apex of the second dielectric pattern 9. That is, the second dielectric pattern 9 has a ring shape, and is not presented near the center on the top of the vibrating cavity 10.

In some embodiments, there is no particular limitation on the shapes of the first dielectric pattern 8 and the second dielectric pattern 9, as long as the first dielectric pattern 8 and the second dielectric pattern 9 may fill in the region A shown in FIG. 2*b* while ensuring that the vibrating diaphragm pattern 4 at the maximum vibrating amplitude does not squeeze the bottom and the side of the vibrating cavity 10.

Alternatively, the above etching barrier layer 6 may also be included in the acoustic transduction unit shown in FIGS. 4*a* and 4*b*. No corresponding drawings are given in this case.

With continued reference to FIGS. 1, 4*a* and 5, in the process of manufacturing the support pattern 3 and the vibrating diaphragm pattern 4 in the acoustic transducer according to the embodiment of the present disclosure, at a region where the vibrating cavity 10 is located, the sacrificial pattern 12 is formed and release holes are formed on the vibrating diaphragm pattern 4; subsequently, the sacrificial pattern 12 is removed through the release holes, obtaining the vibrating cavity 10; and the release holes are filled by filling patterns 7 to seal the vibrating cavity 10. Reference may be made to the following detailed description of the method for manufacturing the acoustic transduction unit.

Taking the acoustic transduction unit with a cavity thickness of 0.14 um and a radius of 17 um as an example, the pull-in operating voltage of the CMUT device of the embodiment of the present disclosure is reduced by about ⅓ compared with the CMUT device in the prior art. At the same AC drive voltage, in the embodiment of the present disclosure, the sound pressure level in far field emission is increased by 4.5 dB (approximately 1.68 times that in the prior art).

The embodiment of the present disclosure also provides an acoustic transducer, which includes an acoustic transduction unit, which is the acoustic transduction unit provided in any of the previous embodiments. The detailed description of the acoustic transduction unit is omitted here.

The acoustic transducer according to the embodiment of the present disclosure includes the acoustic transduction unit provided in any of the previous embodiments, and thus has the same beneficial technical effects.

The embodiment of the present disclosure also provides a method for manufacturing an acoustic transduction unit, which may manufacture the acoustic transduction unit provided in any of the previous embodiments.

Figure 6:
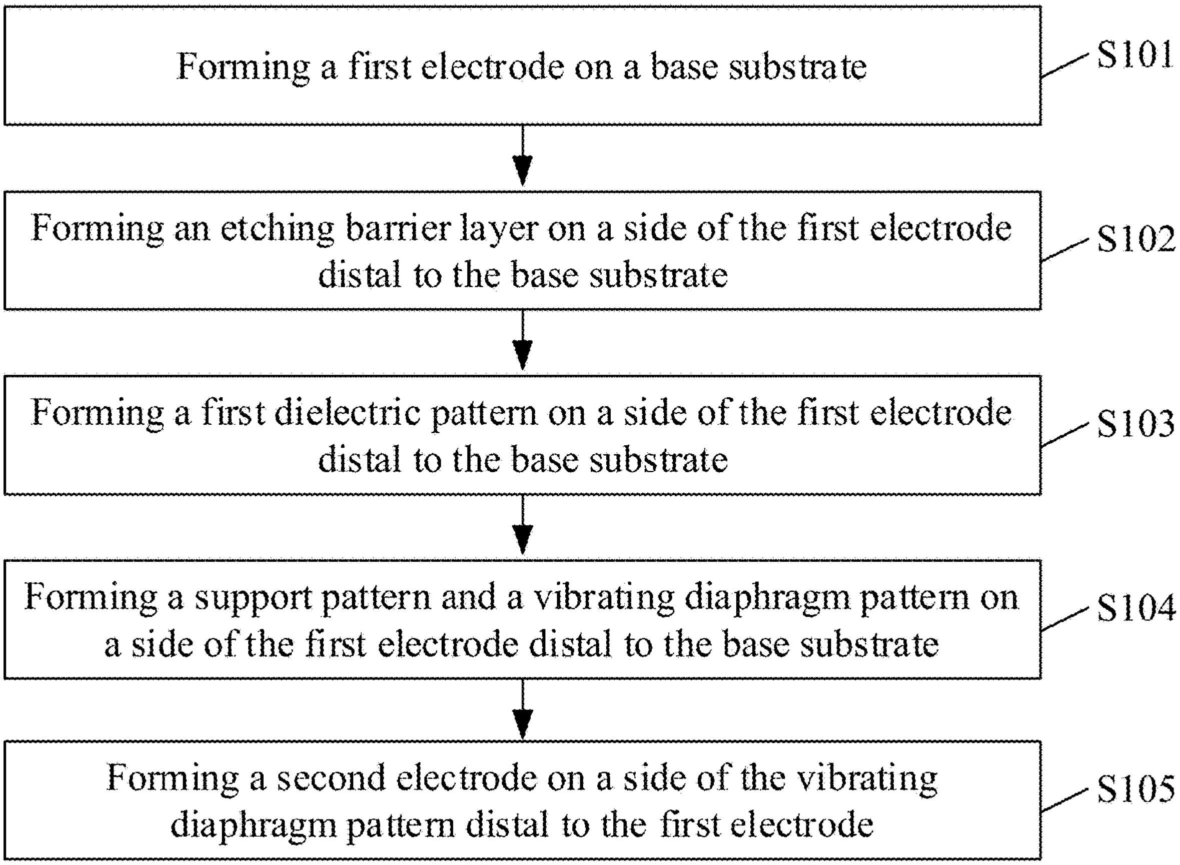
FIG. 6 is a flowchart of a method for manufacturing an acoustic transduction unit according to an embodiment of the present disclosure.

FIG. 6 is a flowchart of a method for manufacturing an acoustic transduction unit according to an embodiment of the present disclosure; FIGS. 7*a* to 7*h* are schematic structural diagrams of intermediate products for manufacturing an acoustic transduction unit using the manufacturing method shown in FIG. 6. As shown in FIG. 6 and FIGS. 7*a* to 7*h*, the manufacturing method may be used to manufacture the acoustic transduction unit shown in FIGS. 1 and 5, and include the following steps S101 to S105:

Step S101, forming a first electrode on a base substrate.

Figure 7A:
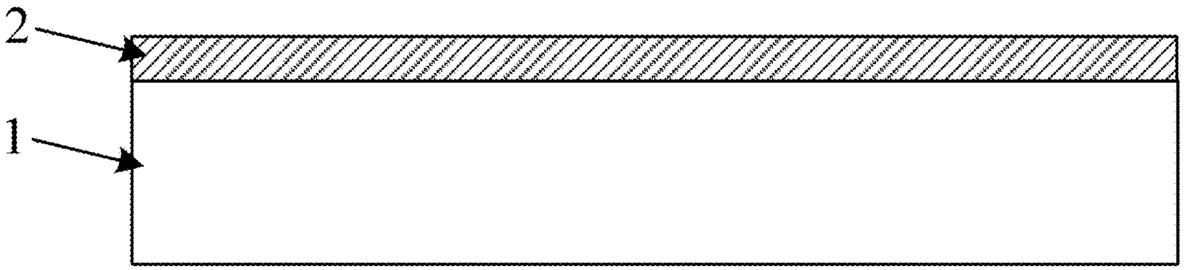
FIGS. 7*a* to 7*h* are schematic structural diagrams of intermediate products for manufacturing an acoustic transduction unit using the manufacturing method shown in FIG. 6.

Referring to FIG. 7*a*, firstly, a first conductive material film is formed on the base substrate 1, and then a patterning process is performed on the first conductive material film to obtain a pattern of the first electrode 2.

The patterning process in the embodiment of the present disclosure is also referred to as a pattern process, and specifically includes process steps, such as photoresist coating, exposure, development, thin film etching, photoresist stripping, and the like. In some embodiments, the patterned film itself is a photoresist, so that the patterning may be completed only by the steps of exposure and development.

S102, forming an etching barrier layer on a side of the first electrode distal to the base substrate.

Figure 7B:
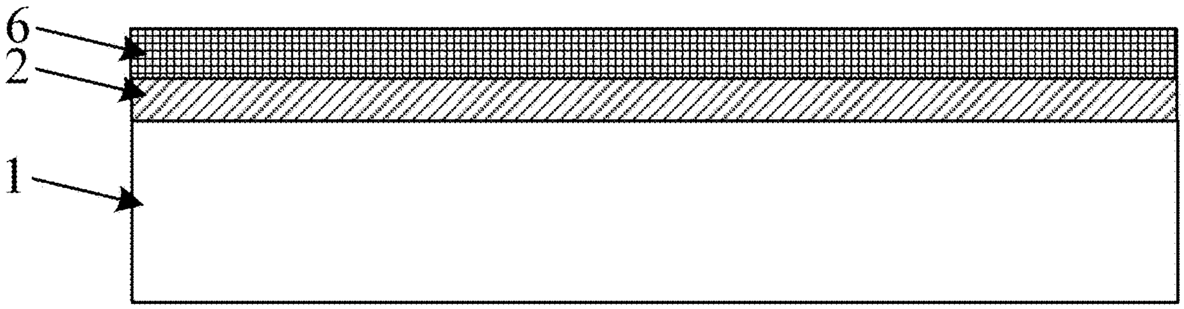

Referring to FIG. 7*b*, the etching barrier layer 6 is formed on the side of the first electrode 2 distal to the base substrate 1. The material of the etching barrier layer 6 may be silicon oxide or silicon nitride.

In manufacturing the acoustic transduction unit shown in FIG. 1, without the etching barrier layer 6, step S102 does not need to be performed.

Step S103, forming a first dielectric pattern on a side of the first electrode distal to the base substrate.

The first dielectric pattern 8 is located in a vibrating cavity 10 formed by encircling a vibrating diaphragm patterns 4 to be formed subsequently, and includes a first vertex located at the bottom of the vibrating cavity 10; a thickness of the first dielectric pattern 8 gradually increases from the first apex to the edge of the first dielectric pattern 8.

In the embodiment of the present disclosure, the first vertex of the first dielectric pattern 8 is located on the side of the first electrode 2 distal to the base substrate 1, and has a certain deviation from the center of the vibrating cavity 10. However, the present disclosure is not limited thereto. In other embodiments, the first vertex of the first dielectric pattern 8 may coincide with the center of the vibrating cavity 10, as shown in FIG. 1.

Figure 8:
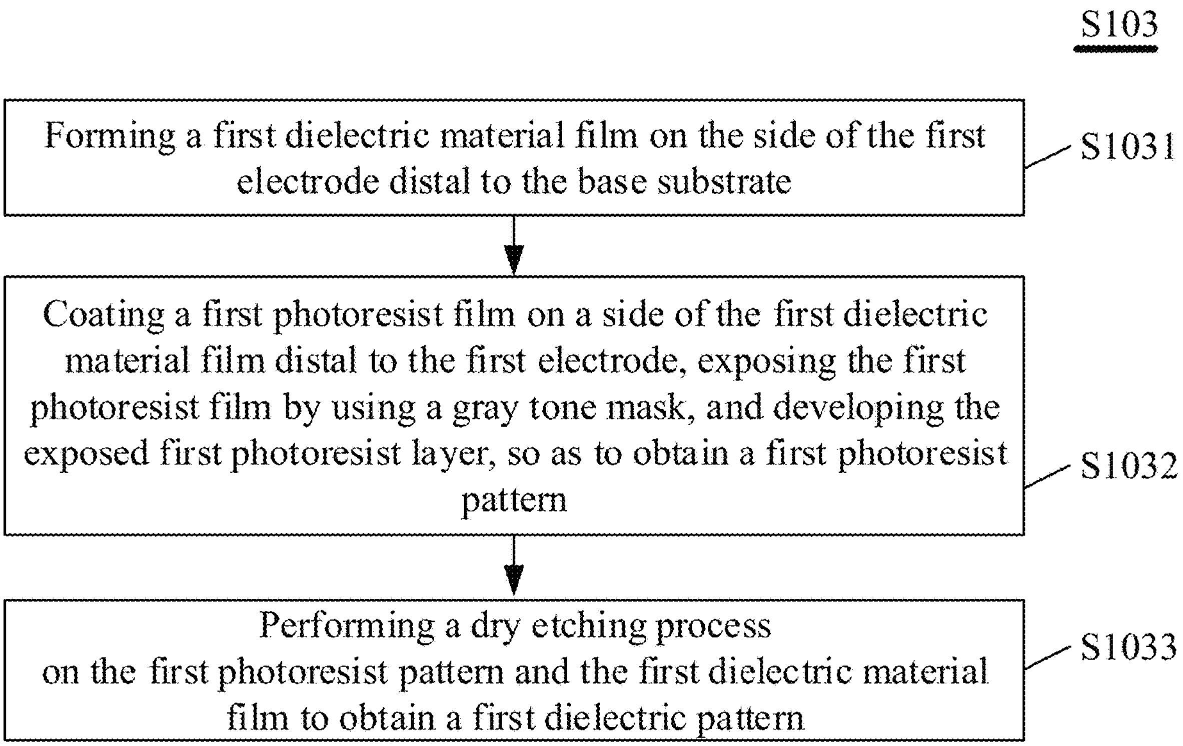
FIG. 8 is a flowchart of an alternative implementation of step S103 according to the embodiment of the present disclosure.

FIG. 8 is a flowchart of an alternative implementation of step S103 according to the embodiment of the present disclosure. As shown in FIG. 8, step S103 includes steps S1031 to S1033:

Step S1031, forming a first dielectric material film 8*a* on the side of the first electrode distal to the base substrate.

Figure 7C:
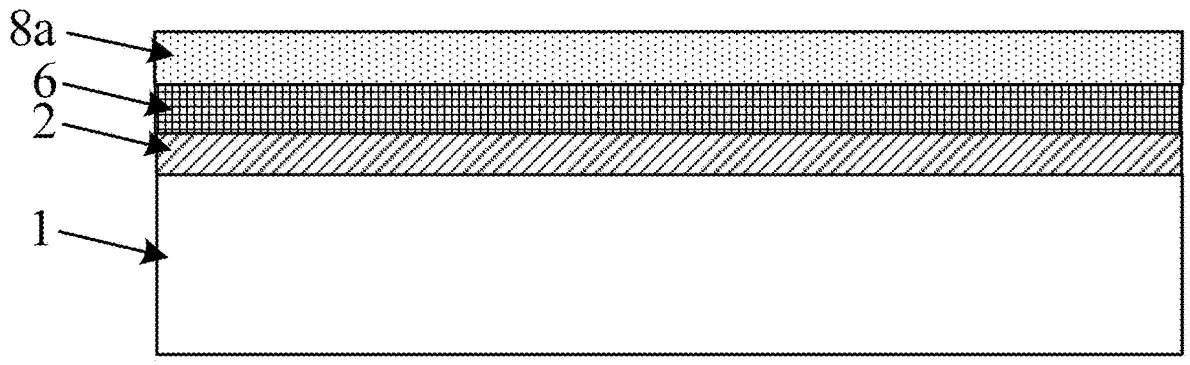

Referring to FIG. 7*c*, the first dielectric material film 8*a* is formed by a deposition process. In some embodiments, the first dielectric material is the same as the material of the etching barrier layer 6. In some embodiments, the first dielectric material may be silicon oxide or silicon nitride.

Step S1032, coating a first photoresist film on a side of the first dielectric material film distal to the first electrode, exposing the first photoresist film by using a gray tone mask, and developing the exposed first photoresist, so as to obtain a first photoresist pattern 11.

Figure 7D:
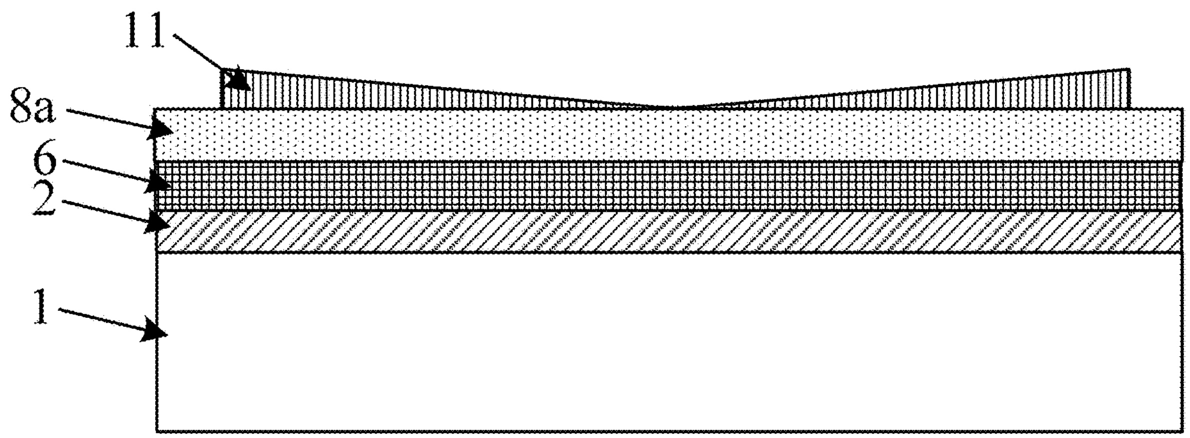

Referring to FIG. 7*d*, the first photoresist pattern 11 having an inclined surface may be obtained by using the gray tone mask. A surface of the first photoresist pattern 11 proximal to the first dielectric material film is a plane parallel to a plane where the base substrate 1 is located, and a surface of the first photoresist pattern 11 distal to the first dielectric material film is a slope surface and intersects with the surface of the first photoresist pattern 11 proximal to the first dielectric material film.

Step S1033, performing a dry etching on the first photoresist pattern and the first dielectric material film to obtain a first dielectric pattern 8.

Figure 7E:
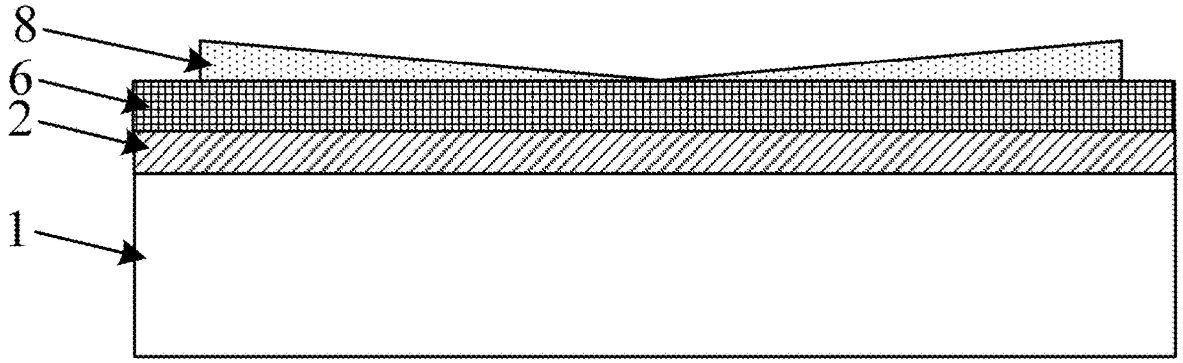

Referring to FIG. 7*e*, the first photoresist pattern 11 and the first dielectric material film are processed through the dry etching process. In the dry etching process, the first photoresist pattern 11 is gradually thinned in the etching process, and the first dielectric material film below the photoresist is gradually exposed and etched away to form a funnel-shaped section with a small slope angle. That is, the surface of the first dielectric pattern 8 distal to the first electrode 2 is a slope surface and intersects with the surface of the first dielectric pattern 8 proximal to the first electrode 2, and the thickness of the first dielectric pattern 8 gradually increases from the first apex to an edge of the first dielectric pattern 8.

Step S104, forming a support pattern and a diaphragm pattern on a side of the first electrode distal to the base substrate.

Figure 9:
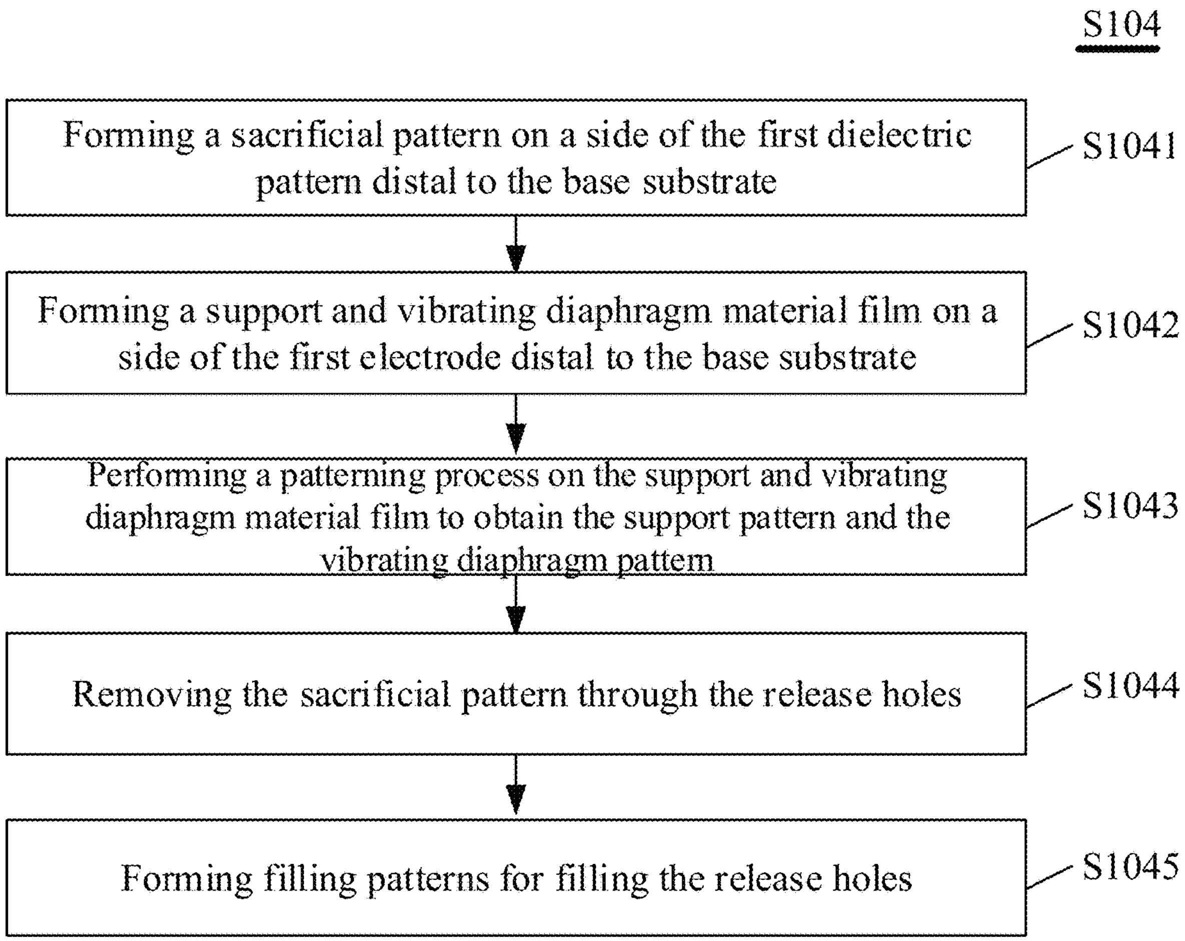
FIG. 9 is a flowchart of an alternative implementation of step S104 according to the embodiment of the present disclosure.

FIG. 9 is a flowchart of an alternative implementation of step S104 according to the embodiment of the present disclosure. As shown in FIG. 9, step S104 includes steps S1041 to S1045:

Step S1041, forming a sacrificial pattern on a side of the first dielectric pattern distal to the base substrate.

Figure 7F:
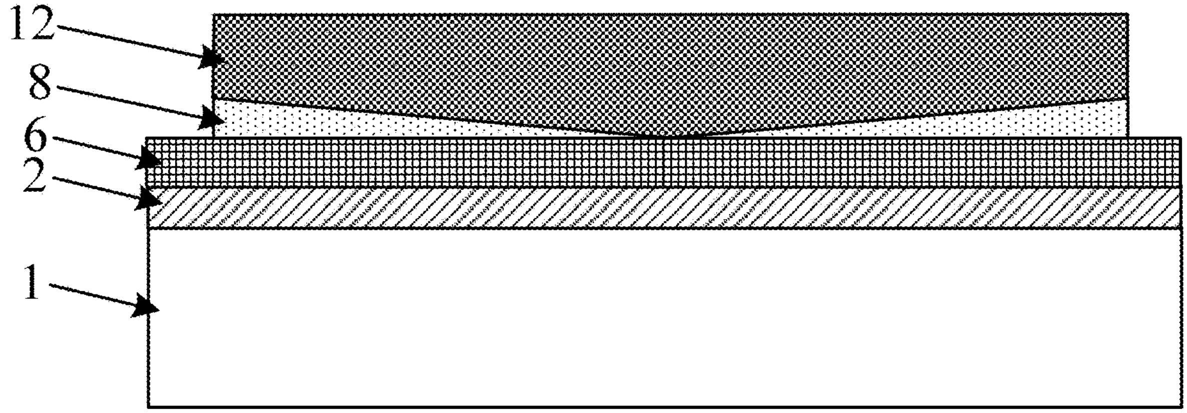

Referring to FIG. 7*f*, firstly, a sacrificial material film is formed on the side of the first dielectric pattern distal to the base substrate 1, and then the sacrificial material film is subjected to the patterning process to obtain the sacrificial pattern 12. The material of the sacrificial patterns 12 may be selected according to specific requirement. It is required that the material of the sacrificial pattern 12 is selected so as not to damage the vibrating diaphragm pattern 4, the support pattern 3, the electrodes, and the like in the subsequent process of removing the sacrificial pattern 12. The material of the sacrificial pattern 12 may be a metal (e.g., aluminum, molybdenum, copper, etc.), a metal oxide (e.g., ITO, etc.), an insulating material (e.g., silicon dioxide, silicon nitride, photoresist, etc.), or the like.

It should be noted that, because a depth-to-width ratio (a ratio of a depth to a width) in the vibrating cavity 10 is very small, the surface of the sacrificial material film tends to be flat during the deposition of the sacrificial material, and therefore, the surface of the manufactured sacrificial pattern 12 distal to the base substrate 1 is parallel or nearly parallel to the plane where the base substrate 1 is located.

If the surface of the manufactured sacrificial pattern 12 is not flat enough, the surface of the sacrificial pattern 12 may be planarized. For example, a photoresist film is coated on the side of the sacrificial pattern 12 distal to the base substrate 1; then, through the gray tone mask process, a part of the photoresist film covering the sacrificial pattern 12 is partially removed (leaving the photoresist at other positions), wherein a surface of the part of the photoresist film on the sacrificial pattern 12, which is distal to the base substrate 1, is a flat plane; then, the photoresist film and the sacrificial pattern 12 are etched to a certain depth, so that the surface of the sacrificial pattern 12 is flat and is parallel to the plane where the base substrate 1 is located. Alternatively, other ways to achieve the planarization of the surface of the sacrificial pattern 12 may also be adopted in the embodiment of the present disclosure, and are not described here by way of example.

Step S1042, forming a support and vibrating diaphragm material film on a side of the first electrode distal to the base substrate.

The support and vibrating diaphragm material film covers the side surface of the sacrificial pattern 12 and the surface of the sacrificial pattern 12 distal to the base substrate 1.

Step S1043, performing a patterning process on the support and vibrating diaphragm material film to obtain the support pattern and the vibrating diaphragm pattern.

Figure 7G:
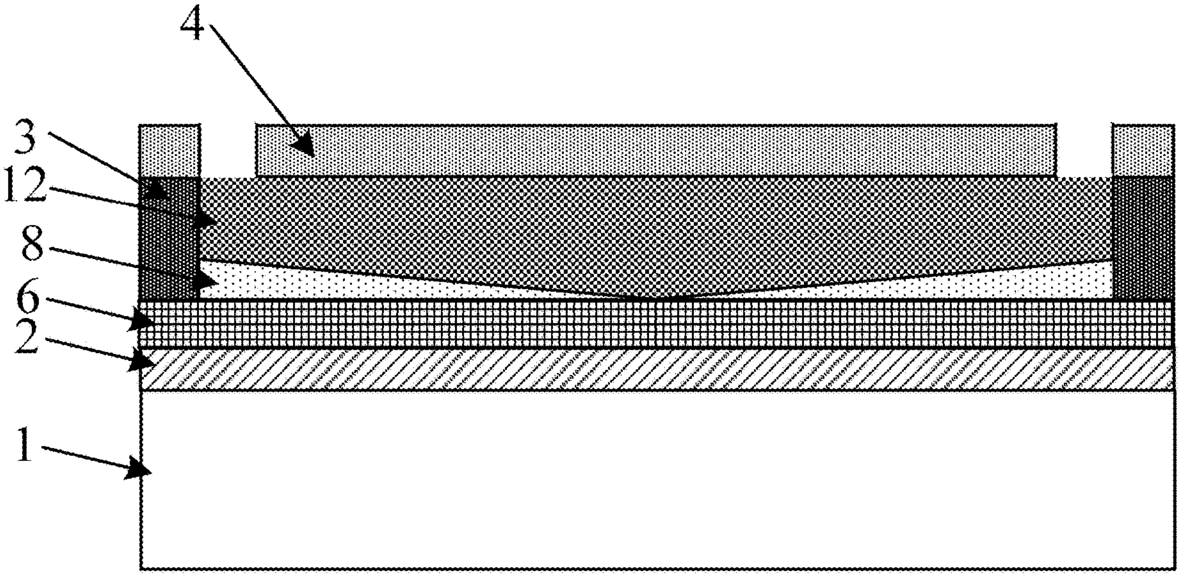

Referring to FIG. 7*g*, the support pattern 3 is located on the side surface of the sacrificial pattern 12; the vibrating diaphragm pattern 4 is located on the surface of the sacrificial layer pattern 12 distal to the base substrate 1, and is located on the surface of the support pattern 3 distal to the base substrate 1; the vibrating diaphragm pattern 4 is formed with release holes.

Step S1044, removing the sacrificial pattern through the release holes.

In step S1044, the sacrificial pattern 12 may be removed through the release holes based on a dry etching or wet etching process, such that the vibrating cavity 10 may be obtained. The process for removing the sacrificial patterns 12 is determined by the material of the sacrificial patterns 12. It is only required to ensure that the vibrating diaphragm pattern 4, the support pattern 3, the electrodes and the like are not damaged in the process of removing the sacrificial pattern 12.

Step S1045, forming filling patterns for filling the release holes.

Figure 7H:
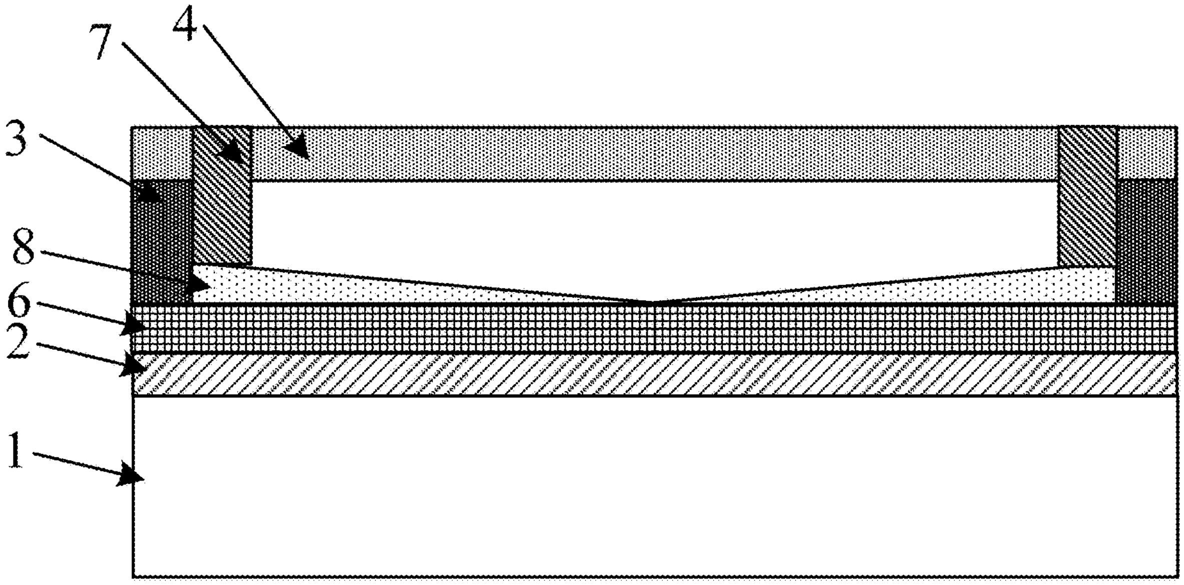

Referring to FIG. 7*h*, the release holes are filled with filling patterns 7 to achieve sealing of the vibrating cavity.

S105, forming a second electrode on a side of the vibrating diaphragm pattern distal to the first electrode.

Referring to FIGS. 1 and 5, firstly, a second conductive material film is formed on the vibrating diaphragm pattern 4, and then a patterning process is performed on the second conductive material film to obtain a pattern of the second electrode 5. The second electrode 5 is disposed opposite to the first electrode 2.

In the embodiment of the present disclosure, referring to FIGS. 1 and 5, the lower surfaces of the filling patterns 7 are in contact with the slope surface of the first dielectric pattern 8. In the embodiment of the present disclosure, referring to FIGS. 1 and 5, the side surfaces of the filling patterns 7 are in contact with the support pattern 3. In the embodiment of the present disclosure, referring to FIGS. 1 and 5, the upper surfaces of the filling patterns 7 are flush with the upper surface of the vibrating diaphragm pattern 4. In the embodiment of the present disclosure, the material of the filling patterns 7 may include: SiO, SiN, etc. that may be grown by using PECVD. In other embodiments of the present disclosure, the material of the filling patterns 7 may include: polymers that may be spin coated, such as PDMS, PI, photoresist, etc.

In the embodiment of the present disclosure, the first dielectric pattern 8 is disposed at the bottom of the vibrating cavity 10, and the thickness of the first dielectric pattern 8 is gradually increased from the first vertex to the edge of the first dielectric pattern 8, so that on the premise of ensuring that the vibrating diaphragm pattern 4 in the acoustic transduction unit may reach the effective travel, the pull-in operating voltage of the acoustic transduction unit may be reduced, while the capacitance of the device may be increased, and the sensitivity of the device may be increased.

Figure 10:
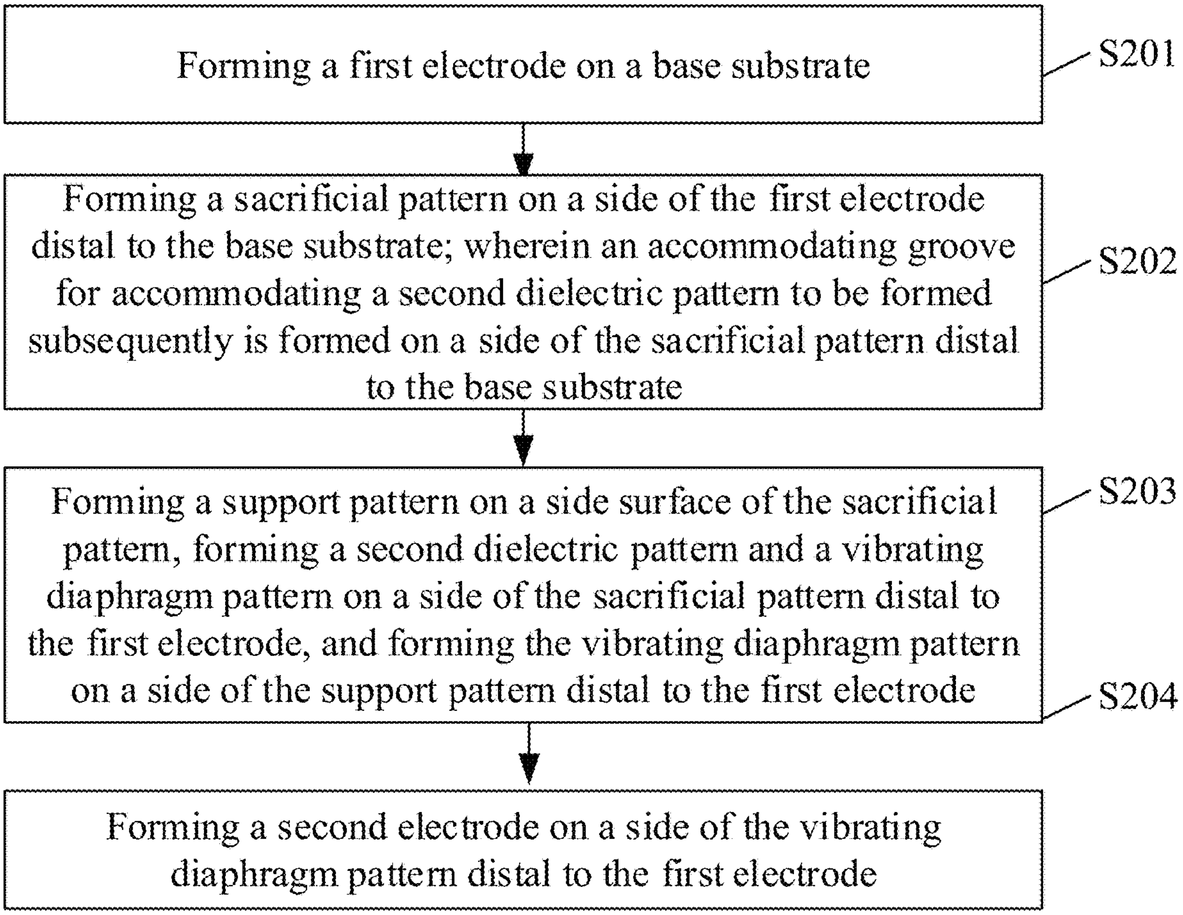
FIG. 10 is a flow chart of another method for manufacturing an acoustic transduction unit according to an embodiment of the present disclosure.

FIG. 10 is a flow chart of another method for manufacturing an acoustic transduction unit according to an embodiment of the present disclosure. FIGS. 11*a* to 11*e* are schematic structural diagrams of intermediate products for manufacturing an acoustic transduction unit using the manufacturing method shown in FIG. 10. As shown in FIG. 10 and FIGS. 11*a* to 11*e*, the manufacturing method may be used for manufacturing the acoustic transduction unit shown in FIG. 4*a*, and include steps S201 to S204:

Step S201, forming a first electrode on a base substrate.

In some embodiments, when the etching barrier layer 6 is present in the acoustic transduction unit, the manufacturing method further includes a step of forming the etching barrier layer 6 after completing the manufacturing of the first electrode 2.

Step S202, forming a sacrificial pattern on a side of the first electrode distal to the base substrate; wherein an accommodating groove for accommodating a second dielectric pattern to be formed subsequently is formed on a side of the sacrificial pattern distal to the base substrate.

Figure 12:
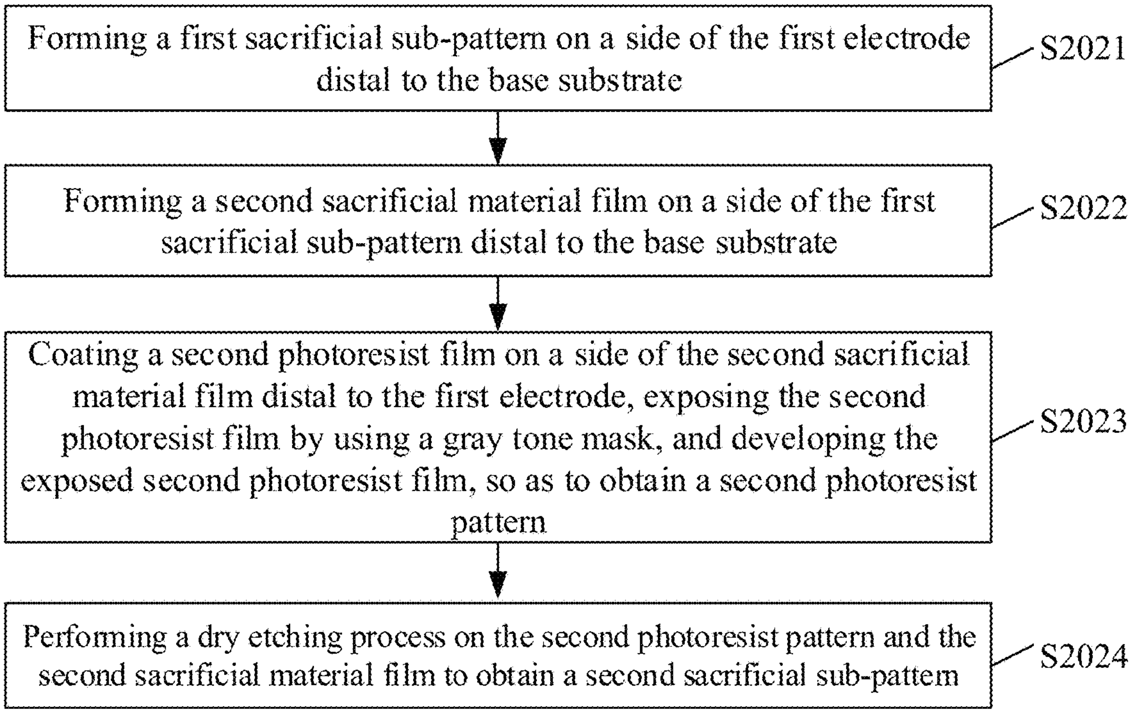
FIG. 12 is a flowchart of an alternative implementation of step S202 according to the embodiment of the present disclosure.

FIG. 12 is a flowchart of an alternative implementation of step S202 according to the embodiment of the present disclosure. As shown in FIG. 12, step S202 includes step S2021 to step S2024:

Step S2021, forming a first sacrificial sub-pattern on a side of the first electrode distal to the base substrate.

Figure 11A:
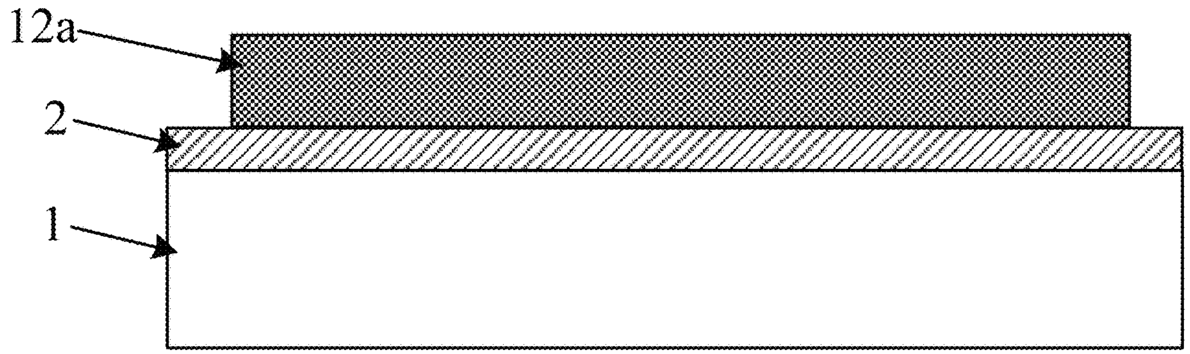
FIGS. 11*a* to 11*e* are schematic structural diagrams of intermediate products for manufacturing an acoustic transduction unit using the manufacturing method shown in FIG. 10.

Referring to FIG. 11*a*, firstly, a first sacrificial material film is formed on the side of the first electrode 2 distal to the base substrate 1, and then a patterning process is performed on the first sacrificial material film to form the first sacrificial sub-pattern 12*a* in a region where the vibrating cavity 10 is to be formed subsequently. A surface of the first sacrificial sub-pattern 12*a* distal to the base substrate 1 is parallel to the plane where the base substrate 1 is located.

Step S2022, forming a second sacrificial material film on a side of the first sacrificial sub-pattern distal to the base substrate.

Step S2023, coating a second photoresist film on a side of the second sacrificial material film 13 distal to the first electrode 2, exposing the second photoresist film by using a gray tone mask, and developing the exposed second photoresist, so as to obtain a second photoresist pattern 14.

Figure 11B:
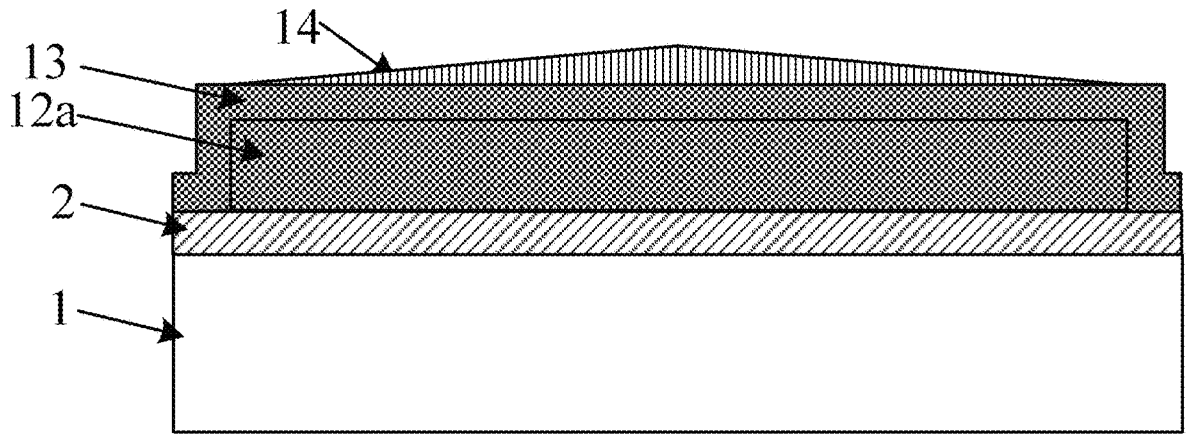

Referring to FIG. 11*b*, a surface of the second photoresist pattern 14 distal to the base substrate is a slope surface, and a thickness of the second photoresist pattern 14 is gradually reduced in a direction from the center toward the edge of the vibrating cavity 10.

Step S2024, performing dry etching on the second photoresist pattern and the second sacrificial material film to obtain a second sacrificial sub-pattern.

Figure 11C:
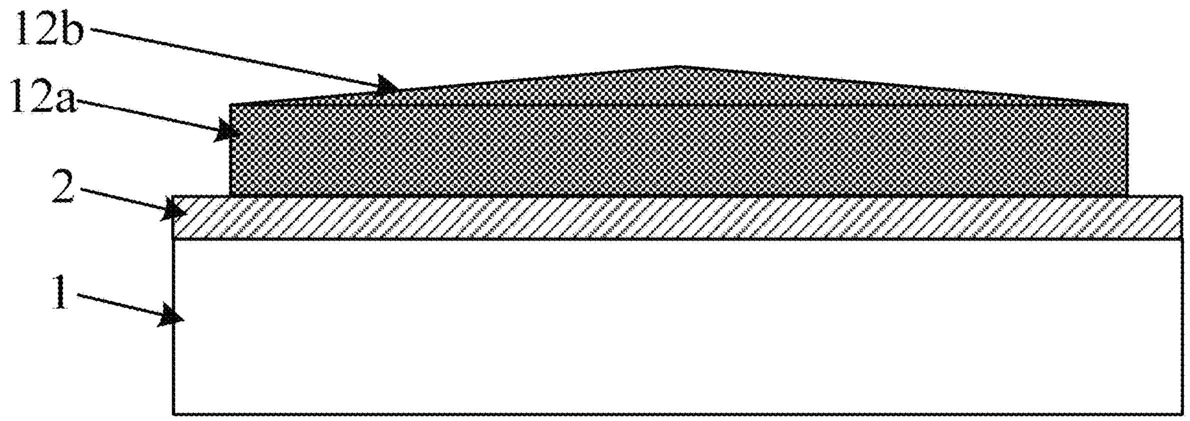

Referring to FIG. 11*c*, in the dry etching process, the second photoresist pattern 14 is gradually thinned in the etching process, and the second sacrificial material film 13 below the second photoresist is gradually exposed and etched away, so as to form an inverted funnel-shaped section with a small slope angle. In addition, a portion of the second sacrificial material film 13 outside the vibrating cavity 10 is completely removed.

A surface of the second sacrificial sub-pattern 12*b* distal to the first electrode 2 is a slope surface and intersects with a surface of the second sacrificial sub-pattern 12*b* proximal to the first electrode 2 so as to form the accommodating groove; the accommodating groove is used for accommodating a second dielectric pattern 9 to be formed subsequently. The first sacrificial sub-pattern 12*a* and the second sacrificial sub-pattern 12*b* form a sacrificial pattern 12.

Step S203, forming a support pattern on a side surface of the sacrificial pattern, forming a second dielectric pattern and a vibrating diaphragm pattern on a side of the sacrificial pattern distal to the first electrode, and forming the vibrating diaphragm pattern on a side of the support pattern distal to the first electrode.

Figure 13:
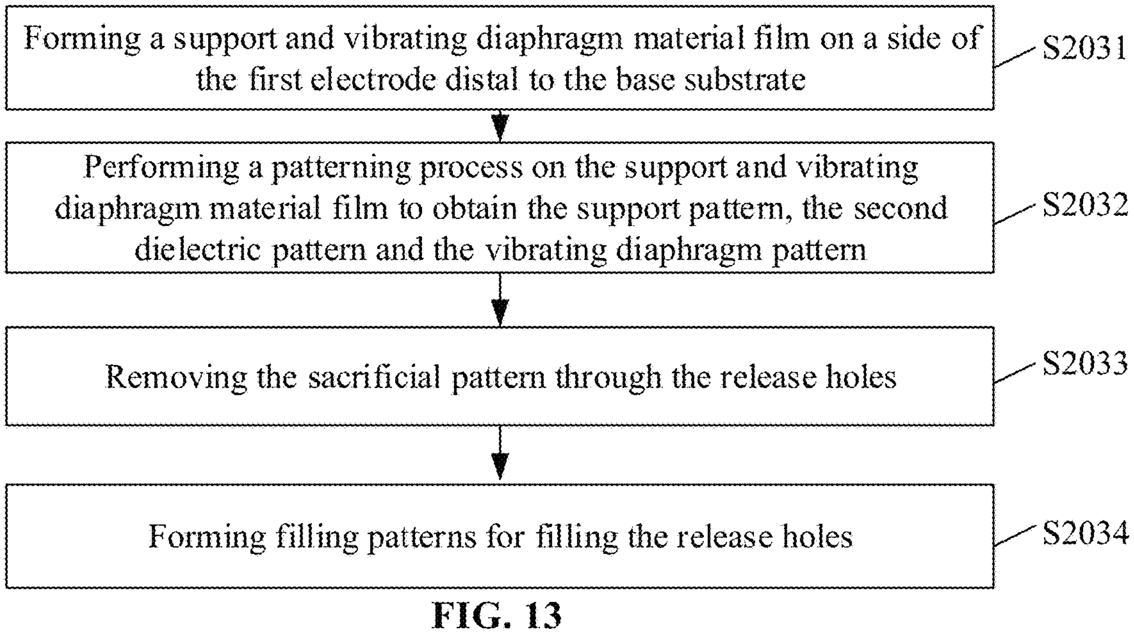
FIG. 13 is a flowchart of an alternative implementation of step S203 according to the embodiment of the present disclosure.

FIG. 13 is a flowchart of an alternative implementation of step S203 according to the embodiment of the present disclosure. As shown in FIG. 13, step S203 includes steps S2031 to S2034:

Step S2031, forming a support and vibrating diaphragm material film on a side of the first electrode distal to the base substrate.

The support and vibrating diaphragm material film covers the side surface of the first sacrificial sub-pattern 12*a* and the surface (i.e. the slope surface) of the second sacrificial sub-pattern 12*b* distal to the base substrate 1.

Step S2032, performing a patterning process on the support and vibrating diaphragm material film to obtain the support pattern, the second dielectric pattern and the vibrating diaphragm pattern.

Figure 11D:
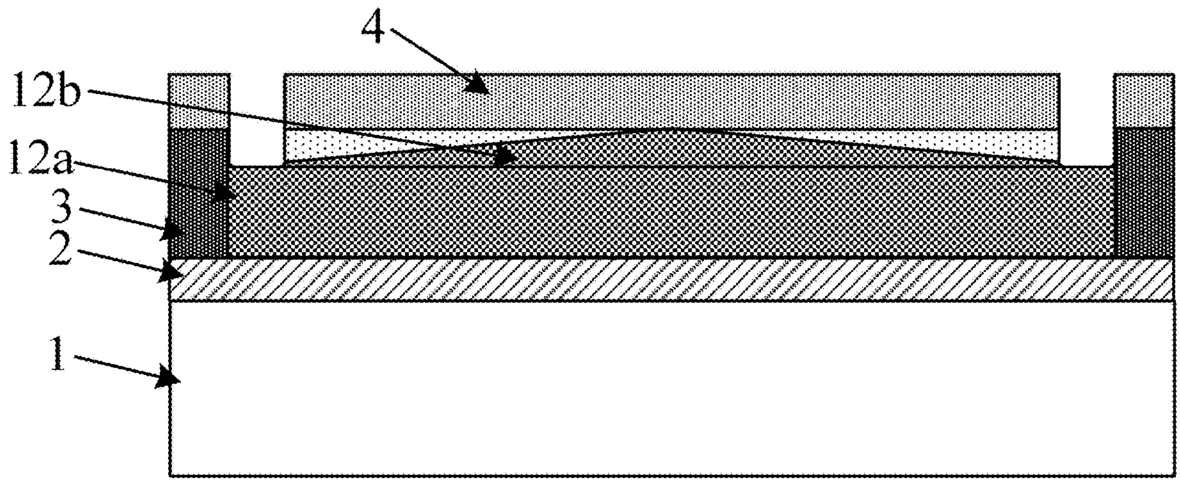

Referring to FIG. 11*d*, the support pattern 3 is located at a side surface of the first sacrificial sub-pattern 12*a*; the second dielectric pattern 9 is located on a side of the second sacrificial sub-pattern 12*b* distal to the base substrate 1 and located in the accommodating groove; the vibrating diaphragm pattern 4 is located on a surface of the second dielectric pattern 9 distal to the base substrate 1, and is located on a surface of the support pattern 3 distal to the base substrate 1; the vibrating diaphragm pattern 4 is formed with release holes. At this time, the second dielectric pattern 9 and the vibrating diaphragm pattern 4 are made of the same material and are integrally formed.

Step S2033, removing the sacrificial pattern through the release holes.

Referring to FIG. 11*d*, the sacrificial pattern 12 is removed through the release holes, resulting in the vibrating cavity 10.

Step S2034, forming filling patterns for filling the release holes.

Figure 11E:
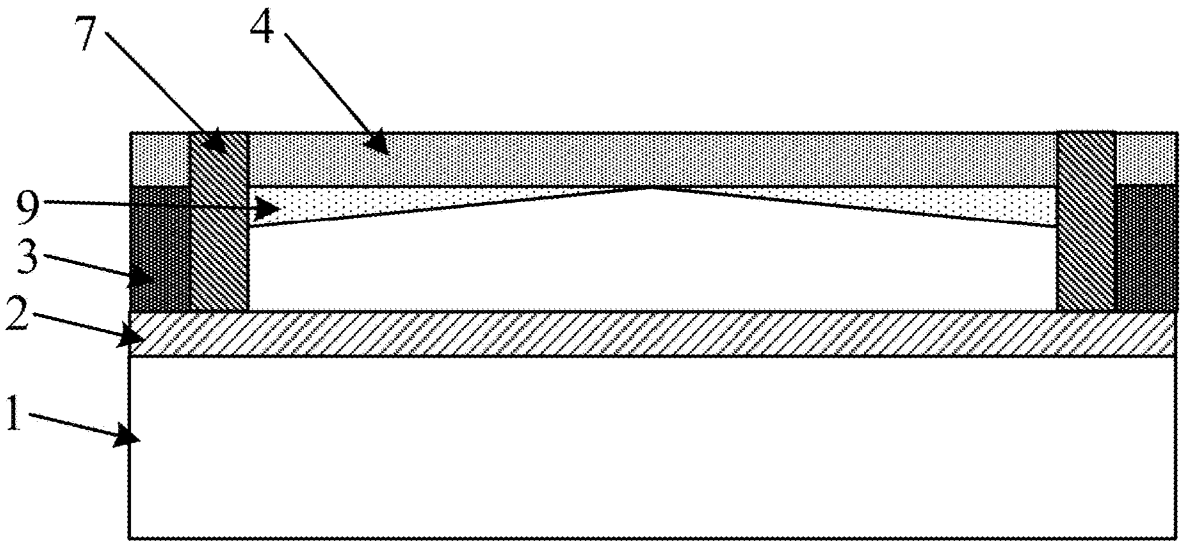

As shown in FIG. 11*e*, the release holes are filled with filling patterns 7 to achieve sealing of the vibrating cavity 10.

S204, forming a second electrode on a side of the vibrating diaphragm pattern distal to the first electrode.

Referring to FIG. 4*a*, firstly, a second conductive material film is formed on the vibrating diaphragm pattern 4, and then a patterning process is performed on the second conductive material film to obtain a pattern of the second electrode 5. The second electrode 5 is disposed opposite to the first electrode 2.

In the embodiment of the present disclosure, the second dielectric pattern 9 is provided on the top of the vibrating cavity 10, and includes the second vertex on the top of the vibrating cavity 10; the thickness of the second dielectric pattern 9 is gradually increased from the second vertex to the edge of the second dielectric pattern 9, so that on the premise of ensuring that the vibrating diaphragm pattern 4 in the acoustic transduction unit may reach the effective travel, the pull-in operating voltage of the acoustic transduction unit may be reduced, while the capacitance of the device may be improved, and the sensitivity of the device may be increased.

In the embodiment of the present disclosure, the second vertex of the second dielectric pattern 9 is located on the side of the vibrating diaphragm pattern 4 distal to the second electrode 5, and has a certain deviation from the center of the vibrating cavity 10. However, the present disclosure is not limited thereto. In other embodiments, the second vertex of the second dielectric pattern 9 may coincide with the center of the vibrating cavity 10, as shown in FIG. 4*a*.

In some embodiments, the method for manufacturing the acoustic transduction unit may include both the step S103 in FIG. 6 and the step S202 in FIG. 10, and the manufactured acoustic transduction unit includes both the first dielectric pattern and the second dielectric pattern, which also falls within the scope of the present disclosure.

It should be understood that the above embodiments are merely exemplary embodiments adopted to explain the principles of the present disclosure, and the present disclosure is not limited thereto. It will be apparent to one of ordinary skill in the art that various changes and modifications may be made therein without departing from the spirit and scope of the present disclosure, and these changes and modifications also fall within the scope of the present disclosure.

What is claimed is:

1. An acoustic transduction unit, comprising: a base substrate, a first electrode, a support pattern, a vibrating diaphragm pattern and a second electrode, wherein the first electrode is on the base substrate; the support pattern is on a side of the first electrode distal to the base substrate; a vibrating cavity is surrounded by the support pattern, the first electrode and the vibrating diaphragm pattern; the vibrating diaphragm pattern is on a side of the support pattern distal to the first electrode, and is configured to vibrate in the vibrating cavity, and the second electrode is on a side of the vibrating diaphragm pattern distal to the first electrode, and is opposite to the first electrode;

wherein the acoustic transduction unit further comprises:

a first dielectric pattern at a bottom of the vibrating cavity and comprising a first apex at the bottom of the vibrating cavity; wherein a thickness of the first dielectric pattern gradually increases from the first vertex to an edge of the first dielectric pattern; and/or, a second dielectric pattern at a top of the vibrating cavity and comprising a second apex at the top of the vibrating cavity; wherein a thickness of the second dielectric pattern gradually increases from the second vertex to an edge of the second dielectric pattern.

2. The acoustic transduction unit according to claim 1, wherein the first vertex of the first dielectric pattern coincides with a center of the vibrating cavity; and/or, the second vertex of the second dielectric pattern coincides with a center of the vibrating cavity.

3. The acoustic transduction unit according to claim 2, wherein the acoustic transduction unit comprises the first dielectric pattern; a surface of the first dielectric pattern proximal to the first electrode is a plane parallel to a plane where the base substrate is located; a surface of the first dielectric pattern distal to the first electrode is a slope surface and intersects with the surface of the first dielectric pattern proximal to the first electrode, and a slope angle between the slope surface and the plane is in a range of (0°, 15°].

4. The acoustic transduction unit according to claim 2, wherein the acoustic transduction unit comprises the second dielectric pattern, a surface of the second dielectric pattern proximal to the vibrating diaphragm pattern is a plane parallel to a plane where the base substrate is located; a surface of the second dielectric pattern distal to the vibrating diaphragm pattern is a slope surface and intersects with the surface of the second dielectric pattern proximal to the vibrating diaphragm pattern, and a slope angle between the slope surface and the plane is in a range of (0°, 15°].

5. The acoustic transduction unit according to claim 3, further comprising:

an etching barrier layer between the first electrode and the support pattern, wherein the acoustic transduction unit comprises the first dielectric pattern, and a material of the first dielectric pattern is the same as that of the etching barrier layer;

the first dielectric pattern extends from the first apex of the first dielectric pattern in a direction from the center toward the edge of the vibrating cavity, such that the thickness of the first dielectric pattern gradually increases from the first apex to the edge of the first dielectric pattern.

6. The acoustic transduction unit according to claim 4, wherein the acoustic transduction unit comprises the second dielectric pattern, and a material of the second dielectric pattern is the same as that of the vibrating diaphragm pattern.

7. The acoustic transduction unit according to claim 6, wherein the second dielectric pattern and the vibrating diaphragm pattern are connected to each other and have a one-piece structure.

8. The acoustic transduction unit according to claim 2, wherein the acoustic transduction unit comprises the first dielectric pattern; a surface of the first dielectric pattern proximal to the first electrode is a plane parallel to a plane where the base substrate is located; a surface of the first dielectric pattern distal to the first electrode is a slope surface and intersects with the surface of the first dielectric pattern proximal to the first electrode, and a slope angle between the slope surface and the plane is in a range of (0°, 15°], and the acoustic transduction unit comprises the second dielectric pattern, a surface of the second dielectric pattern proximal to the vibrating diaphragm pattern is a plane parallel to a plane where the base substrate is located; a surface of the second dielectric pattern distal to the vibrating diaphragm pattern is a slope surface and intersects with the surface of the second dielectric pattern proximal to the vibrating diaphragm pattern, and a slope angle between the slope surface and the plane is in a range of (0°, 15°].

9. The acoustic transduction unit according to claim 8, wherein a material of the first dielectric pattern is the same as that of an etching barrier layer, which is between the first electrode and the support pattern;

wherein the first dielectric pattern extends from the first apex of the first dielectric pattern in a direction from the center toward the edge of the vibrating cavity, such that the thickness of the first dielectric pattern gradually increases from the first apex to the edge of the first dielectric pattern; and wherein the acoustic transduction unit comprises the second dielectric pattern, and a material of the second dielectric pattern is the same as that of the vibrating diaphragm pattern; and the second dielectric pattern and the vibrating diaphragm pattern are connected to each other and have a one-piece structure.

10. An acoustic transducer, comprising: at least one acoustic transduction unit according to claim 1.

11. The acoustic transducer according to claim 10, wherein the first vertex of the first dielectric pattern coincides with a center of the vibrating cavity; and/or, the second vertex of the second dielectric pattern coincides with a center of the vibrating cavity.

12. The acoustic transducer according to claim 11, wherein the acoustic transduction unit comprises the first dielectric pattern; a surface of the first dielectric pattern proximal to the first electrode is a plane parallel to a plane where the base substrate is located; a surface of the first dielectric pattern distal to the first electrode is a slope surface and intersects with the surface of the first dielectric pattern proximal to the first electrode, and a slope angle between the slope surface and the plane is in a range of (0°, 15°].

13. The acoustic transducer according to claim 11, wherein the acoustic transduction unit comprises the second dielectric pattern, a surface of the second dielectric pattern proximal to the vibrating diaphragm pattern is a plane parallel to a plane where the base substrate is located; a surface of the second dielectric pattern distal to the vibrating diaphragm pattern is a slope surface and intersects with the surface of the second dielectric pattern proximal to the vibrating diaphragm pattern, and a slope angle between the slope surface and the plane is in a range of (0°, 15°].

14. A method for manufacturing the acoustic transduction unit according to claim 1, comprising steps of:

forming a first electrode on a base substrate;

forming a support pattern and a vibrating diaphragm pattern on a side of the first electrode distal to the base substrate, wherein the support pattern is located on a side of the first electrode distal to the base substrate, and the vibrating diaphragm pattern is located on a side of the support pattern distal to the first electrode, such that a vibrating cavity is surrounded by the support pattern, the first electrode and the vibrating diaphragm pattern, and the vibrating diaphragm pattern is configured to vibrate in the vibrating cavity; and forming a second electrode on a side of the vibrating diaphragm pattern distal to the first electrode, wherein the second electrode is provided opposite to the first electrode;

wherein after the step of forming the first electrode and before the step of forming the support pattern and the vibrating diaphragm pattern, the method for manufacturing the acoustic transduction unit further comprises:

forming a first dielectric pattern on a side of the first electrode distal to the base substrate, wherein the first dielectric pattern is located at the bottom of the vibrating cavity and comprises a first vertex located at the bottom of the vibrating cavity; a thickness of the first dielectric pattern gradually increases from the first vertex to an edge of the first dielectric pattern; and/or, while forming the support pattern and the vibrating diaphragm pattern, the method for manufacturing the acoustic transduction unit further comprises:

forming a second dielectric pattern located at the top of the vibrating cavity and comprising a second apex located at the top of the vibrating cavity; wherein a thickness of the second dielectric pattern gradually increases from the second vertex to an edge of the second dielectric pattern.

15. The method for manufacturing the acoustic transduction unit according to claim 14, wherein the first vertex of the first dielectric pattern coincides with a center of the vibrating cavity; and/or, the second vertex of the second dielectric pattern coincides with a center of the vibrating cavity.

16. The method for manufacturing the acoustic transduction unit according to claim 15, wherein the step of forming a first dielectric pattern on a side of the first electrode distal to the base substrate comprises steps of:

forming a first dielectric material film on the side of the first electrode distal to the base substrate;

coating a first photoresist film on a side of the first dielectric material film distal to the first electrode, exposing the first photoresist film by using a gray tone mask, and developing the exposed first photoresist film, so as to obtain a first photoresist pattern, wherein a surface of the first photoresist pattern proximal to the first dielectric material film is a plane parallel to a plane where the base substrate is located, and a surface of the first photoresist pattern distal to the first dielectric material film is a slope surface and intersects with the surface of the first photoresist pattern proximal to the first dielectric material film;

performing a dry etching process on the first photoresist pattern and the first dielectric material film to obtain a first dielectric pattern, wherein the surface of the first dielectric pattern distal to the first electrode is a slope surface and intersects with the surface of the first dielectric pattern proximal to the first electrode.

17. The method for manufacturing the acoustic transduction unit according to claim 16, wherein the step of forming a support pattern and a vibrating diaphragm pattern on a side of the first electrode distal to the base substrate comprises steps of:

forming a sacrificial pattern on a side of the first dielectric pattern distal to the base substrate;

forming a support and vibrating diaphragm material film on a side of the first electrode distal to the base substrate, wherein the support and vibrating diaphragm material film covers a side surface of the sacrificial pattern and the surface of the sacrificial pattern distal to the base substrate;

performing a patterning process on the support and vibrating diaphragm material film to obtain the support pattern and the vibrating diaphragm pattern, wherein the support pattern is located on the side surface of the sacrificial pattern; the vibrating diaphragm pattern is located on the surface of the sacrificial layer pattern distal to the base substrate, and is located on the surface of the support pattern distal to the base substrate; the vibrating diaphragm pattern is formed with release holes;

removing the sacrificial pattern through the release holes, to obtain the vibrating cavity; and forming filling patterns for filling the release holes.

18. The method for manufacturing the acoustic transduction unit according to claim 15, wherein the step of forming the support pattern, the vibrating diaphragm pattern, and the second dielectric pattern comprises steps of:

forming a sacrificial pattern on a side of the first electrode distal to the base substrate; wherein an accommodating groove for accommodating a second dielectric pattern to be formed subsequently is formed on a side of the sacrificial pattern distal to the base substrate;

forming a support pattern on a side surface of the sacrificial pattern, forming a second dielectric pattern and a vibrating diaphragm pattern on a side of the sacrificial pattern distal to the first electrode, and forming the vibrating diaphragm pattern on a side of the support pattern distal to the first electrode, wherein the vibrating diaphragm pattern is located on a side of the second dielectric pattern distal to the first electrode, and release holes are formed on the vibrating diaphragm pattern;

removing the sacrificial pattern through the release holes, to obtain the vibrating cavity; and forming filling patterns for filling the release holes.

19. The method for manufacturing the acoustic transduction unit according to claim 18, wherein the sacrificial pattern comprises: a first sacrificial sub-pattern and a second sacrificial sub-pattern provided in a stack, wherein the step of forming the sacrificial pattern comprises steps of:

forming a first sacrificial sub-pattern on a side of the first electrode distal to the base substrate;

forming a second sacrificial material film on a side of the first sacrificial sub-pattern distal to the base substrate;

coating a second photoresist film on a side of the second sacrificial material film distal to the first electrode, exposing the second photoresist film by using a gray tone mask, and developing the exposed second photoresist film, so as to obtain a second photoresist pattern, wherein a surface of the second photoresist pattern distal to the base substrate is a slope surface, and a thickness of the second photoresist pattern is gradually reduced in a direction from the center toward the edge of the vibrating cavity;

performing a dry etching process on the second photoresist pattern and the second sacrificial material film to obtain the second sacrificial sub-pattern, wherein a surface of the second sacrificial sub-pattern distal to the first electrode is a slope surface and intersects with a surface of the second sacrificial sub-pattern proximal to the first electrode so as to form the accommodating groove.

20. The method for manufacturing the acoustic transduction unit according to claim 19, wherein the step of forming the support pattern on a side surface of the sacrificial pattern and forming the second dielectric pattern and the vibrating diaphragm pattern on a side of the sacrificial pattern distal to the first electrode and forming the vibrating diaphragm pattern on a side of the support pattern distal to the first electrode comprises steps of:

forming a support and vibrating diaphragm material film on a side of the first electrode distal to the base substrate, and performing a patterning process on the support and vibrating diaphragm material film to obtain the support pattern, the second dielectric pattern and the vibrating diaphragm pattern.

* * * * *